United States Patent
Yemini et al.

(10) Patent No.: US 7,930,158 B2
(45) Date of Patent: Apr. 19, 2011

(54) METHOD AND APPARATUS FOR MULTI-REALM SYSTEM MODELING

(75) Inventors: Shaula Alexander Yemini, Briarcliff Manor, NY (US); Salvatore DeSimone, Woodbury, CT (US); Patricia Gomes Soares Florissi, Briarcliff Manor, NY (US); Shmuel Kliger, Ossining, NY (US); Eyal Yardeni, Ardsley, NY (US)

(73) Assignee: EMC Corporation, Hopkinton, MA (US)

( * ) Notice: Subject to any disclaimer, the term of this patent is extended or adjusted under 35 U.S.C. 154(b) by 594 days.

(21) Appl. No.: 10/813,842

(22) Filed: Mar. 31, 2004

(65) Prior Publication Data
US 2005/0021742 A1 Jan. 27, 2005

Related U.S. Application Data

(60) Provisional application No. 60/459,007, filed on Mar. 31, 2003.

(51) Int. Cl.
*G06F 17/50* (2006.01)
(52) U.S. Cl. .................................................. 703/13
(58) Field of Classification Search ............... 703/1, 2, 703/13; 717/104
See application file for complete search history.

(56) References Cited

U.S. PATENT DOCUMENTS

| | | | |
|---|---|---|---|
| 6,289,382 B1 * | 9/2001 | Bowman-Amuah | 709/226 |
| 7,020,697 B1 * | 3/2006 | Goodman et al. | 709/223 |
| 2003/0079160 A1 * | 4/2003 | McGee et al. | 714/39 |

OTHER PUBLICATIONS

Johnston et al. Using enterprise management to provide infrastructure assurance, 1999, Military Communications Conference Proceedings, vol. 1, pp. 464-468.*
Buford et al. Managing Dynamic IP Services: Correlation-Based Scenarios and Architecture, 2001, Enterprise Networking, Appliclations and Services Conferences, IEEE, pp. 75-81.*
Song et al. A component based approach for modeling and validation of an automated manufacturing system, 2001, IEEE, pp. 465-474.*
Semeria, Multiprotocol Label Switching: Enhancing Routing in the New Public Network, 1999,Juniper Networks Inc, pp. 1-20.*

* cited by examiner

*Primary Examiner* — Paul L Rodriguez
*Assistant Examiner* — Eunhee Kim
(74) *Attorney, Agent, or Firm* — Krishnendu Gupta; Joseph D'Angelo

(57) ABSTRACT

A method and apparatus are provided for multi-realm system modeling (MRSM) for dividing systems into components, defining realms containing objects representing system components, optionally defining relationships between the system components, defining associations between realms sufficient to unify objects in the realms when needed, and unifying objects in the realms based on the associations. The realms are defined in a way that enables unified processing for various applications of MRSM.

64 Claims, 41 Drawing Sheets

METHOD AND APPARATUS FOR MULTI-REALM SYSTEM MODELING

RELATED APPLICATION

The present invention is based on and claims priority from U.S. Provisional Patent Application Ser. No. 60/459,007 filed on Mar. 31, 2003 and entitled SYSTEM MANAGEMENT USING MULTI-REALM SYSTEM MODELING, which is incorporated by reference herein in its entirety.

BACKGROUND OF THE INVENTION

1. Field of the Invention

The present invention generally relates to modeling systems in order to perform processing functions such as, e.g., modeling, analysis, control, design, simulation, and management. More particularly, it relates to modeling dynamic or static systems by integrating models of intersecting or non-intersecting pieces of the system. Pieces of the system can be defined in a way that enables processing to be performed on individual models of each piece, and the results to be integrated into a system-wide result.

2. Description of Related Art

The present application relates to modeling dynamic or static systems, which can include, but are not limited to, enterprise management systems, engineering systems, networked information technology (IT) systems, utility systems, utility computing systems, autonomic computing systems, on-demand systems, electric power grids, biological systems, medical systems, weather systems, financial market systems, and business process systems. Such systems can be modeled for a variety of purposes including, e.g., monitoring, analysis, control, design, simulation, and management.

A model of a system is an abstract description of the system. The description will generally include sufficient details needed for the intended use of the model. For example, a model of a computer system may describe computers as having components such as processors, memory, disk, etc. They may further associate attributes with components, e.g., processor speed. Some models further include potential relationship between components, such as containment, connectivity, etc. to allow modeling the complex web of relationships in the real world.

Some models further include the semantics or meaning of the components and relationships. For example, the model of a processor may include specifying typical processor operations, or even typical processor problems, and the events each problem can cause.

Models are often expressed by using a formal specification that describes the characteristics of the components of the system, and the relationships between the components. Additionally, several paradigms can be used to describe the model. For example, an object-oriented paradigm can be used, in which the system components are modeled using objects, and relationships between components of the system are modeled either as attributes of an object, or objects themselves. Alternatively, a denotation paradigm can be used, in which the specification focuses on what the system does rather than how it operates. An operational paradigm can also be used, where the specification describes how the system operates. A database paradigm may specify entities and relationships. Furthermore, several different paradigms may be combined in any given specification.

Many formal languages are available for system modeling. In many cases, some languages will be more suitable than others depending on particular purpose of the model. These purposes can include, but are not limited to, documentation, design, analysis, reliability assessment, management, and simulation. The language used may be textual, e.g., Managed Object Definition Language (MODEL) available from System Management ARTS, Inc. of White Plains, N.Y., DMTF Common Information Model (CIM), Varilog, NS, C++, C, SQL, or graphical (e.g., state machines, VDHL, etc). Some modeling tasks may include different models of the same target system for different purposes.

Systems are conventionally modeled either as a monolithic whole or as divided into pieces, usually along the boundaries of its constituent subsystems. The description that follows on the related art will use subsystems as example of pieces of the system, but other possible divisions of the system into pieces are possible. Many times systems are modeled in order to perform some type of processing on the model reflecting some processing on the system. Complex models of complex systems are often too intricate to be effectively processed as a monolithic whole. If systems are divided into subsystems, known modeling methods fail to provide suitable techniques for dividing the system in a manner that enables processing to be performed on subsystems, and then results integrated into a system-wide result.

Such integration of processing results is difficult to achieve. This difficulty is further compounded when the system is dynamic, i.e., components/relationships are added/deleted/modified in real-time.

An example of a database system with several subsystems is shown in FIG. 1. The database system includes user client systems (e.g., a workstation at the user premises) connected to a Web server front-end at the service provider premises. The Web server in turn uses a load-balancing director to relay queries to several back-end databases servers. The connectivity between the client and the Web server can occur via a virtual private network or VPN while the connectivity at the service provider can occur through a local network.

Any system can, in theory, be modeled as a single monolithic whole. Such modeling can be performed using various modeling mechanisms, e.g., DMTF Common Information Model (CIM), which models a wide variety of objects of a distributed system, including applications, networks, systems, and organizations. (Common Information Model (CIM) Specification, Version 2.2. Distributed Management Task Force, Inc., Jun. 14, 1999).

Monolithic modeling, however, has many problems that increase the complexity of both representing the system and performing processing on it.

Firstly, the potentially large number of components may render the approach impractical. For example, an IT system with all of its hardware components, hosts, switches, routers, desktops, operating systems, applications, business processes, etc. may include millions of objects. It may be difficult to employ any manual or automated method to create a monolithic model of such a large number of components and their relationships. This problem is compounded by the typical dynamic nature of IT systems having frequent adds/moves/changes.

Secondly, there is no abstraction or hiding of details, to allow a processing function to focus on the details of a particular set of relevant components while hiding less relevant component details.

Thirdly, it may be impractical to perform any processing on the overall system because of the number of components involved.

The common approach is thus to divide complex systems into subsystems.

In the case of IT systems, there are several natural forms of dividing systems by following their architecture, e.g., along layers and/or tiers. But there are also many other different ways the same system can be divided into subsystems for different purposes.

In the example of FIG. 1, in which the system is divided into subsystems, the client subsystem model could represent the database service as one object without exposing all the internal details of the database service. This can be contrasted with the monolithic representation of all the myriad of components in the database service, including the service provider network nodes.

Several difficulties arise in processing subsystem models in a manner that enables integrating the results. Many of these difficulties stem from dependencies and relationships between the behaviors of objects that are assigned to different subsystem models. Changes to components in one subsystem may create propagated changes in other components in other subsystems. For example, if a node is added to the network, many relationships in the system, including the client-service ones, may have to change in order to reflect the addition of the new node. The same effects need to be reflected in the models of the respective subsystems.

It is difficult to separate the monolithic model into subsystems also because, e.g., several types of processing require understanding the overall system model. For example, fault management processing (the isolation of faults within a system) may require correlating events across many subsystem models because problems in one component often spread symptoms to related components in other subsystems, e.g., a problem in a network device may ultimately cause application transactions to time out.

Similarly, in provisioning an IT service, correctness depends on the properties of the infrastructure entities supporting the service. The natural split into subsystems would be to have separate subsystems for the service layer and for the underlying infrastructure. The division cannot ignore the interdependencies between subsystems. With respect to the database system of FIG. 1, the subsystems are inter-dependent or causally related because any behavior in one subsystem may propagate and generate behaviors in other subsystems and thus affect overall processing. For example, a VPN link failure event can generate a "database inaccessible" event at the client. Due to the overall system complexity, it is very difficult to understand what is happening in the system as a whole without understanding the relationships between the different subsystems.

As another example, referring to the example in FIG. 1, a degraded response time perceived by the client database query may be due to an ineffective load balancing director, which may be due to a malfunction of a database server in the cluster, which in turn may be due to a non-responsive interface event, which in turn may be due to a failed network connection event, which in turn may be due to broken VPN link connectivity as a result of a hardware problem at the service provider. The hardware problem is the root cause for all the events across multiple subsystems, including the database access failure event. The difficulty is that this analysis requires correlation processing of events across subsystem boundaries. No single subsystem in this example has enough data to identify the root cause.

It is also difficult to unify different levels of abstractions or different perspectives on the same components or their behavior. In other words, there can be difficulty in expressing behaviors in terms of components and relationships familiar to the subsystem, while hiding details of other subsystems. In the previous FIG. 1 example, from the perspective of the client, the root cause behavior is that the database is malfunctioning. From the perspective of the database service site, some VPN link is down. From the perspective of the VPN service provider, a specific hardware component failed. Each subsystem only has partial view of the whole system and may want to identify the root cause behavior using abstractions contained within the models of its specific components.

There can also be difficulty in capturing the meaning of a relationship between components in different subsystems. Subsystem relationships may need to include semantic information to aid in integrating processing across subsystems. For example, in FIG. 1, a database client is related to the database server through a transaction relationship. If a database server has problems, the transaction may or may not suffer. If the problem impacts performance, it will affect only transactions that have real-time response constraints. Only if the client-server relationship in the example is real-time, should the modeled server failure cause a performance impact on the client subsystem. The key information to accurately modeling of the system and its behavior is the meaning or semantics of the inter-subsystem relationships.

A need accordingly exists for an improved method and system for modeling systems.

BRIEF SUMMARY OF EMBODIMENTS OF THE INVENTION

Briefly, in accordance with one or more embodiments of the invention, a method is provided for modeling a dynamic or static system having one or more components. The method includes defining two or more realms, which are collections of objects to represent the components and relationships between components of the system, and one or more associations between realms sufficient to unify the objects in the realms when needed. The system is divided based on some set of criteria into a plurality of components and relationships modeled by respective objects in the realms. Associations between realms are identified. The associations can be models of the same component or components represented in two or more realms, or a model of a relationship between different components represented in two or more realms or a combination thereof. Associations unify objects in the realms by identifying them as representing the same system component or components, or by relating objects according to some relationship between their represented components. Furthermore, the realms are defined in a way that enables unified processing for several applications of multi-realm system modeling (MRSM) described below.

In accordance with one or more further embodiments of the invention, a model of a system is provided. The model includes a plurality of realms, each containing objects representing one or more system components and relationships between components. Each realm may or may not include associations with other realms. The association can be objects representing the same component or components in a plurality of realms, or objects representing a relationship or relationships between different components in a plurality of realms or a combination thereof. Associations unify objects across realms that represent the same system component or components, or that relate objects representing related components in the system.

MRSM in accordance with one or more embodiments can have a wide range of applications, including but not limited to, enterprise management systems, business service management systems, real-time enterprise systems, IT systems (including but not limited to networks of any type, IP networks, wireless networks, optical networks, virtual private networks, Multi-Protocol Label Switching (MPLS) networks, layered networks, end-to-end infrastructure, application servers, network security systems, large scale engineering systems, distributed systems, messaging systems, and ERP systems), utility systems, utility computing systems, autonomic computing systems, on-demand systems, grid computing systems, on-demand systems, adaptive systems, electric power grids, biological systems, medical systems, weather systems, financial market systems, and business processes.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

DETAILED DESCRIPTION OF PREFERRED EMBODIMENTS

Figure 1:
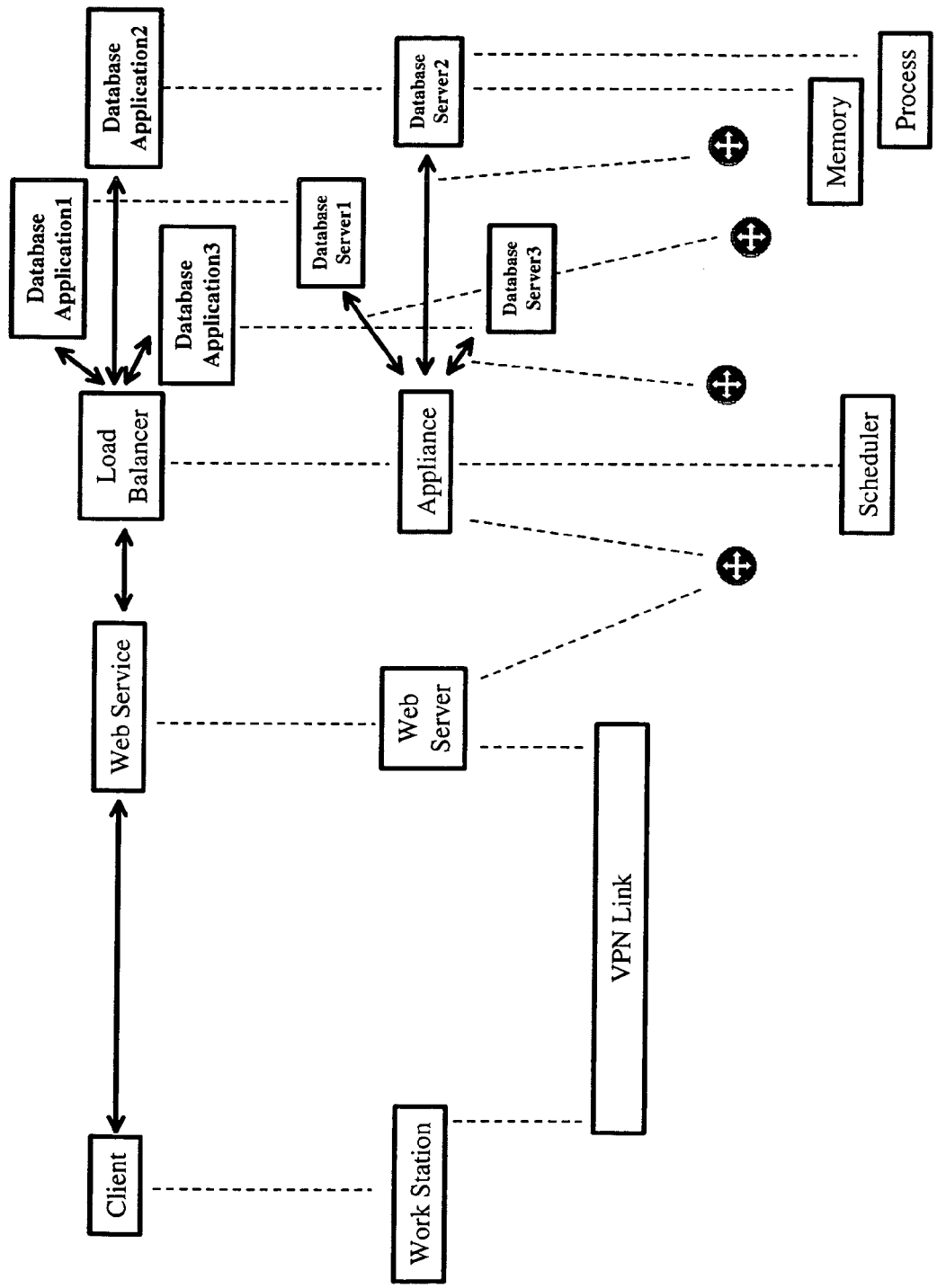
FIG. 1 is a diagram illustrating an exemplary Web-based query system.

The present application is generally directed to modeling dynamic or static systems to perform processing functions, including but not limited to, modeling, analysis, control, design, simulation, and management (e.g., fault, performance, configuration, accounting, performance, provisioning, visualization, and others). Such systems can include, but are not limited to, enterprise management systems, business service management systems, real-time enterprise systems, IT systems (including but not limited to networks of any type, IP networks, wireless networks, optical networks, virtual private networks, MPLS networks, layered networks, network security systems, end-to-end infrastructure, application servers, large scale engineering systems, distributed systems, messaging systems, and ERP systems), utility systems, utility computing systems, autonomic computing systems, grid computing systems, on-demand systems, adaptive systems, electric power grids, biological systems, medical systems, weather systems, financial market systems, and business processes.

Briefly, in accordance with one or more embodiments of the invention, a method and apparatus are provided for MRSM for partitioning or dividing dynamic or static systems into components, defining realms containing objects representing system components, optionally defining relationships between the system components, defining associations between realms sufficient to unify objects in the realms when needed, and unifying objects in the realms based on the associations. Furthermore, the realms are defined in a way that enables unified processing for various applications of MRSM, some examples of which are described below.

As used herein, a "realm" is any collection of objects that model some or all components of a system and/or relationships between the components. Realms can be defined in accordance with generally any given criteria. For example, in an IT system, realms can correspond to tiers, layers, technology domains, organizational responsibility, management functions, etc., of the system.

As used herein, the term "component" refers to a logical or physical element or collection of elements of the system. (For example, in an IT system, components can include hardware or software, logical or physical entities such as applications, databases, servers, storage equipment, network devices, protocol entities, server and database application combined, a VPN, a configuration of a host, etc.). Components can also represent abstract entities such as, e.g., an online connection, transaction, trade, business service. Within a model of the system, an object or a modeled object is a representation of a system component or is a representation of a relationship between system components.

As used herein, the term "system" refers to a target collection of components. The system may optionally contain information components about the system itself (e.g., configuration files, log files, information about components like type, etc.) and also about the information itself (e.g., where configuration files are located, how often logs are updated, etc.). A system may be divided into sub-systems, with each sub-system containing one or more system components. The system can be dynamic or static. In a dynamic system, the collection of components may vary dynamically.

As used herein, the term "object" refers to an abstract representation of a component or set of components of the system. An object can also be an abstract representation of a relationship between components. Objects typically contain several characteristics or attributes.

As used herein, the term "relationship" refers to an attribute of an object or a special type of object that represents some form of association among objects in the system, e.g., a transaction, a virtual path, a system constraint, a containment, a connectivity, a layering relationship, a client-server relationship, a consumer-producer relationship, etc.

As used herein, the term "model" refers to any set of objects (including relationships). A model may optionally be based on an object oriented paradigm.

As used herein, the terms "division" and "dividing" refer to selecting a subset of the components of a system or a subset of the objects of a model. (It should be noted that the same object or portions thereof can be represented in multiple realms.)

As used herein, the term "piece" of a system refers to any subset of the components of the system. Pieces may or not intersect, that is, include one or more of the same components of the system.

As used herein, the term "association" refers to two or more objects of different realms representing the same system component or the same collection of system components; or an object representing a relationship or relationships between system components. Note that an association may be a model of a relationship or relationships between realms. Note further that an association may be a combination of one or more objects and one or more relationships.

As used herein, the term "unification" refers to the manual or automated process of recognizing that two or more objects represent the same component or portions thereof, or collection of components; or that two or more objects are related because they represent related components.

As noted above, as used herein, the term "processing" refers to any manual or automated process that uses a model of a system or pieces of a system, including but not limited to modeling itself, analysis, control (e.g., configuration, provisioning), presentation, design, simulation, and management.

As used herein the term "unified processing" refers to processing that can be distributed into several processing instances on different realms in such a way that results can be combined based on the associations between the realms into a system wide result.

Figure 2:
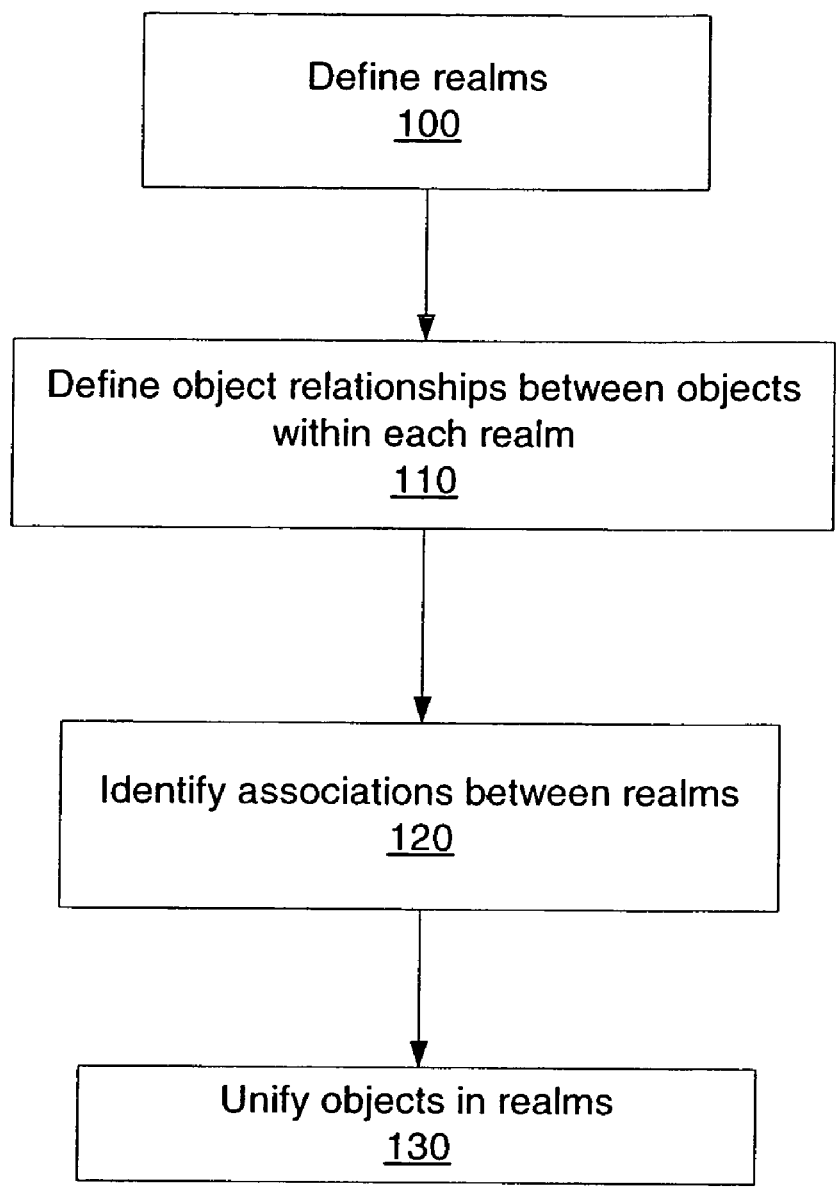
FIG. 2 is a flowchart generally illustrating a modeling method in accordance with one or more embodiments of the invention.

FIG. 2 is a flow chart that briefly illustrates an exemplary modeling method in accordance with one or more embodiments of the invention. The method can be used to divide a system S having a plurality of components into multiple integrated components. A user can select any desired division criteria to define the components. The system S can be divided into n components $C_1, C_2, \ldots, C_n$, each corresponding to objects in one or more realms. Each component $C_i$ is represented by $m(i)$ objects $O_1, O_2, \ldots, O_{m(i)}$. The definition of a modeled object can include optional attributes and relationships, which are characteristics of the component. For example, attributes of a processor could include speed, number of registers, bus interface size, etc. Attributes of a network connection can include speed, loss rate, type of transmission, etc. The division of a system into components may occur using a manual or automated process.

At step 100, realms $R_1, R_2, \ldots, R_m$ are constructed including at least one object representing models for components of interest in the system.

At step 110, object relationships $R(O_{i,k}, O_{i,l})$ are defined between any related objects $k$ and $l$ within each realm $R_i$, where $R(O_{i,k}, O_{i,l})$ denotes a relationship between objects $O_{i,k}$ and $O_{i,l}$. The definition of a relationship can include optional attributes. It should be noted that the relationship is a type of object, or an attribute of an object. (Alternatively, the object relationships can be defined when the realms are defined at step 100.)

At step 120, associations between realms are identified. These associations can be objects (O), relationships (R( )), or collections of objects and relationships. This step may be automated in certain instances, e.g., if there is some commonality between associations such as objects in different realms having the same name or some common properties.

Relationships $R(O_{i,k}, O_{j,l})$ can be defined between related objects $O_{i,k}$ and $O_{j,l}$ of different realms $R_i$ and $R_j$. The definition of a relationship can include optional attributes. A relationship can relate different objects representing the same component (e.g., $O_{i,k}$ and $O_{j,l}$ can model the same component in different realms) or relate different components. This step can be at least partly automated. For instance, a generic model can be defined manually, but can be enhanced automatically from information, e.g., in configuration files.

At step 130, a unification of related objects or relationships in associations is performed. The unification is the process of recognizing that objects related in the associations of two or more realms represent the same system component or components, or a relationship or relationships between system components. The unification process can be automated and is further described below.

It should be noted that the defined relationships can also relate relationships between objects. For example, a client/service relationship object may be related to the system route relationships. The latter can relate the nodes participating in the route.

The meaning or semantics of the defined relationship can be specified. For example, an application object may have a "runs_on" relationship to a server object; a socket object may have a "reliably_connected" relationship to another socket object, etc.

Once the relationships are defined, the propagation of behaviors along associations between realms can optionally be specified. This is particularly useful, e.g., for event correlation analysis, root cause analysis, business impact analysis, configuration, provisioning, simulation, and other monitoring, analysis, and control functions.

Further details of the steps of the above method are provided below. For purposes of illustration, several examples used herein to illustrate various aspects of the method relate to dynamic networked I.T. systems. It should be understood, however, that the invention is not limited to such systems. Other systems that can be modeled in accordance with the embodiments of the invention described herein include, but are not limited to, enterprise management systems, engineering systems, utility systems, utility computing systems, autonomic systems, electric power grids, biological systems, medical systems, weather systems, financial market systems, and business processes.

In dividing a system into components, virtually any selected division criteria can be used. Each component may have an associated object in a realm in the system model.

Examples of possible division criteria include, but are not limited to, the following:

(1) A different realm can be associated with any subset of objects representing components of the system.

(2) A different realm can be associated with each different technology domain or layer, e.g., in an IT system, a realm for the physical network, a realm for the link layer, a realm for the network layer, a realm for the system layer, a realm for middleware, a realm for the application layer, and a realm for the business services layer.

(3) Different realms can be associated with different divisions of components within a layer, e.g., in a nationwide IT system, a realm for the east coast IT, a realm for the central IT, and a realm for the west coast IT systems.

(4) Different realms can be associated with different perspectives on the same subsystem or the same set of components. For example, one realm can model the normal or baseline behavior of a particular subsystem, and another realm can model its real time behavior, e.g., to identify deviations from the baseline.

(5) Different realms can be associated with different levels of abstraction of the same subsystem or the same set of components, e.g., in a tiered system, a realm can be associated with each tier.

In more specific cases, a realm can be associated with different:

(a) Management functions (e.g., configuration, fault, provisioning, accounting, etc.);

(b) Technology domains (e.g., hardware, software, wireless, IP, databases, storage, etc.);

(c) Application domains (e.g., messaging system, e-mail, web, etc.);

(d) Business domains (e.g., consumer, enterprise, etc.);

(e) Organizational structure (e.g., marketing, IT, R&D, sales, management, etc.);

(f) Aspects of the enterprise (e.g., sales, development, business, etc.);

(g) Geography (e.g., Europe, Asia, Americas, etc.);

(h) Layers of a business stack (e.g., business processes, applications that support them, infrastructure that supports the applications, etc.);

(i) Different organizations (e.g., in an IT system, a realm for the service provider network and a realm for the customer network attached to the service provider network); or (j) Any combination of the above.

Once the system has been divided into components and corresponding objects and realms defined, the realms can be linked based on identified associations into a coherent representation of the whole system. The methods for linking the realms can include, but are not limited, to the following:

(1) A component that is represented by an object in two different realms can be used to link the two or more realms together. Though the object appears in both realms, it may represent, in each realm, different roles or attributes of the represented component. The object serves as an association between the realms. Repeated objects that link related realms can be unified into a single semantic object in the overall system, i.e., the repeated objects are identified in the model as representing the same system component.

(2) A relationship can be used to link two related objects in two separate realms. This can include determining whether a relationship already exists between the two objects that can be used to link the realms together, or whether a new relationship should be defined. New relationships can be represented as first-class objects themselves, that is, relationships are a type of object (and the object serves as an association) or relationships can be attributes of an object. For example, a relationship between a client subsystem and a server subsystem can be a transaction. But the transaction itself is a component of the system that may be modeled by an object with attributes such as response time, uptime since start, etc.

Figure 3:
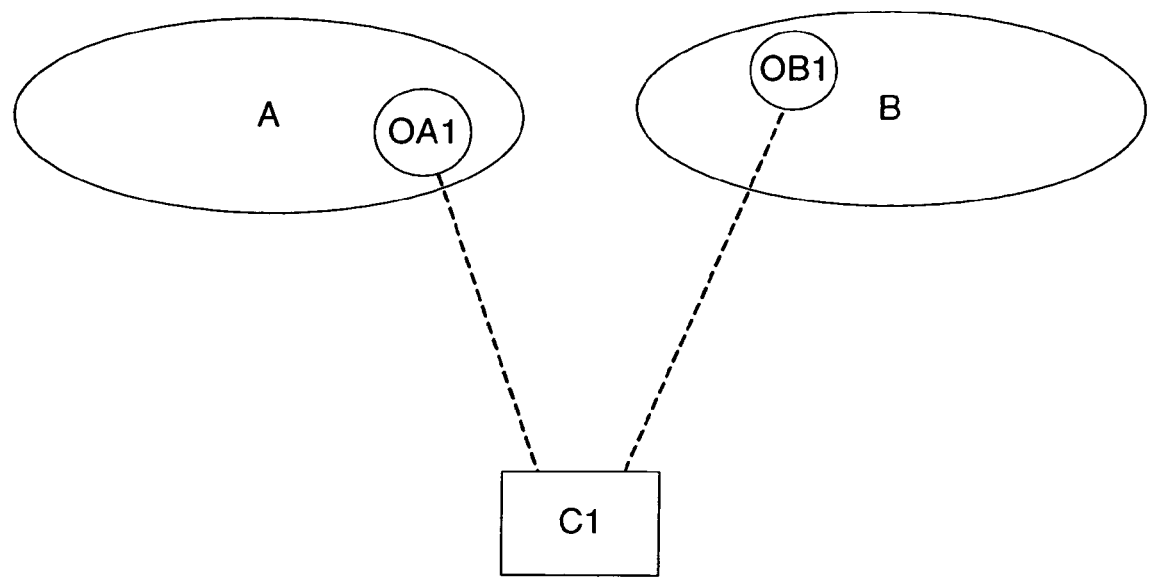
FIG. 3 is diagram generally illustrating modeling of a component.
Figure 4:
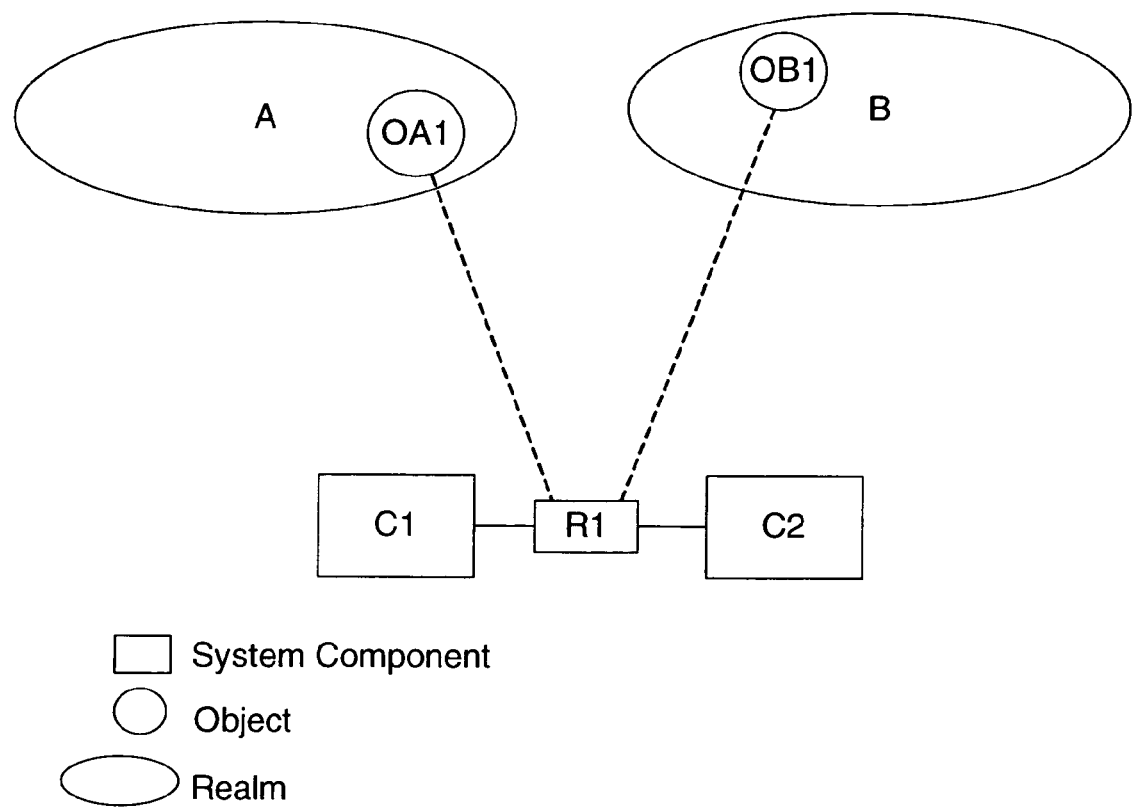
FIG. 4 is diagram generally illustrating modeling of a relationship between components.
Figure 5:
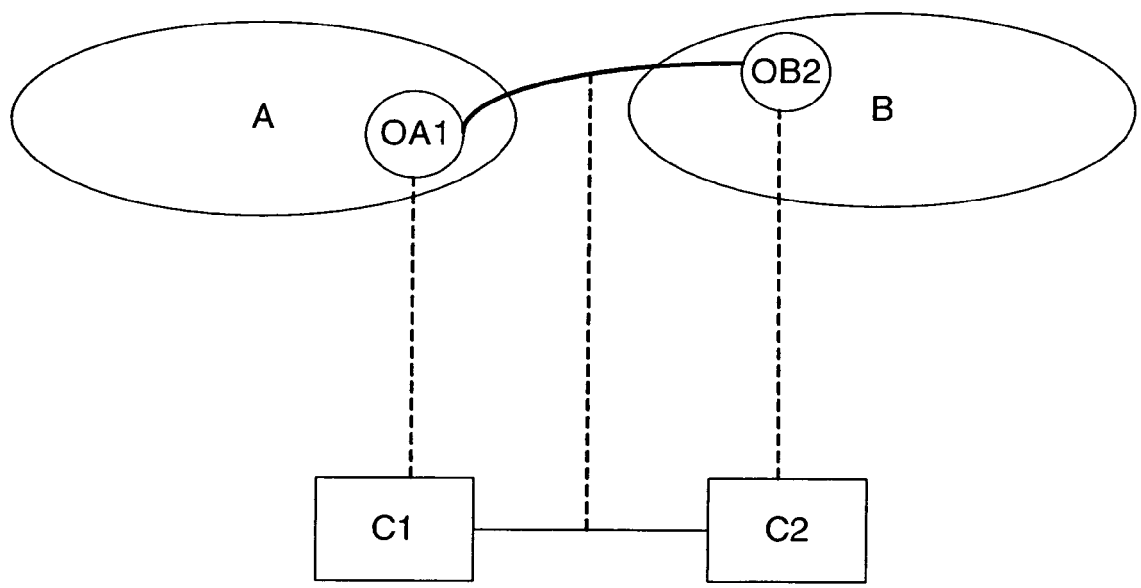
FIG. 5 is diagram generally illustrating modeling of an attribute relationship between components.

A general description of modeling system components in accordance with one or more MRSM embodiments is now described with respect to FIGS. 3-5. FIG. 3 illustrates modeling a component C1 of the system. The component C1 is represented using two objects OA1 and OB1 in two separate realms A and B, respectively. OA1 and OB1 may be the same or different. For example, if different, OA1 may model some of the attributes (e.g., business related) of C1 while OB1 may model other attributes (e.g., system related).

FIG. 4 illustrates one possible representation of a relationship between components of a system. The system components C1 and C2 are related by relationship R1. R1 may be explicit in the system (e.g., a link) or it may be implicit (e.g., some common property of the object). The relationship is represented in the model with objects OA1 and OB1.

R1 could also have been represented using an attribute relationship (as opposed to object relationship) between the objects representing C1 (i.e., OA1) and C2 (i.e., OB2) as shown in FIG. 5. In should be noted that in this example, R1 is implicit in the system. However, it could have been explicit as in the FIG. 2 example.

It should be noted that these are only examples of relationships. In some applications of MRSM, one object may represent several system components or several objects may represent one system component.

It should be further noted that C1 and C2 in the previous example could be explicit relationships in the system. OA1 and OB2 in this case are relationship objects that are related themselves by another relationship object.

Modeling in accordance with various embodiments of the invention allows unified processing, that is, several processing functions to be executed in the system by independently executing the processing function in the individual realms and combining the results based on the associations between realms to obtain a system-wide result. For instance, the model can allow analysis processing of behaviors within realms. To obtain an accurate analysis result for the whole system, also requires analysis of how behaviors propagate across realms through the associations. The associations should be selected to enable propagation of behaviors in the same way the behaviors propagate in the system. For example, in an application server environment, one may model the client realm, the provider network realm, the web realm, and the server realm. Failure of the provider network realm will impact the client/server interaction performance. The model will represent the propagation of events in the provider network realm to the client/server interactions in the client and the sever realms through the modeled associations. That way, the model can be used to analyze the performance impact in the client realm by following the association with the provider network realm and other realms.

Realms and respective associations between realms can be selected to enable execution of processing functions. For example, criteria of defining associations can minimize or reduce the number of objects in different realms that represent the same system component while still being able to perform unified processing. Reducing or minimizing the number of such objects avoids unnecessary repeated processing.

When defining realms, objects in the realms may be defined such that the number of objects (including relationships) in associations is reduced or minimized. There are two general cases to consider: the case where realms are of the same type and the case where realms are of different types.

Realms of the same type can for example represent objects and relationships as a graph of nodes (objects) and links (relationships). Generally any graph partitioning algorithm can be applied to partition such a graph such that the number of objects in the associations is minimized or reduced. In certain embodiments, the Kernighan-Lin algorithm can be used to optimize the assignment. The Kernighan-Lin algorithm, described in "An Efficient Heuristic Procedure for Partitioning Graphs" by B. W. Kernighan and S. Lin in vol. 49 (February 1970) of The Bell Systems Technical Journal, pages 291-307, provides an efficient heuristic method to partition a graph into two sections. Several other algorithms can also be used to partition graphs in multiple sections. The sections resulting from such algorithms can correspond to MRSM realms.

Realms of different types may be defined along any number of criteria. For example, along the types or classes of objects representing the system components. For example, Let O1 be an object of type T1 and O2 be another object of type T2. Assume that there is a relationship R(T1, T2) between T1 and T2. O1 and O2 can be separated in two realms R1 and R2 according to the types T1 and T2. The relationship R(T1, T2) can then be modeled in several ways in the association between realms: an explicit relationship between O1 and O2 (between realms), object O1 or some parts of it modeled in R2, or object O2 or parts of it modeled in R1.

As an example, one may define a network realm and a server realm. The object representing an edge network node can be replicated in both realms to provide the association. Alternatively, an object representing the server may be replicated to provide the association. Finally, a relationship between a server object and a edge node object may provide the association.

The process above can be generalized as follows:
1. Select all types of objects T1, T2, . . . , Tn that have relationships with other types.
2. Define a realm Ri for each type Ti ($1 \leq i \leq n$).
3. Include objects of each type Ti in Ri.
4. For each relationship between types R(Ti, Tj), $1 \leq i, j \leq n$, define an association using one of the following options:
   a. Define a relationship R(Ti, Tj) between objects of Ti and Tj.
   b. Include an object Oi or part thereof of type Ti in Rj.
   c. Include an object Oj or part thereof of type Tj in Ri.

Another possibility in defining realms is using the attributes of each class or type. Objects that have similar attributes can be included in the same realm, or objects that have a particular subset of attributes can be included in the same realm. The associations in this case are defined by repeating objects (or parts thereof) with the similar attributes or subset of attributes in different realms. Or a relationship can be created between such objects. For example, switches whose name start with "Finance" in the Finance realm, switches whose name start with HR in another HR realm, and all switches in a infrastructure realm. The repeated objects provide the associations between the Finance realm and the infrastructure realm, and between the HR realm and the infrastructure realm.

The techniques described above for different realms can minimize or reduce the number of objects in the associations by selecting partitions of the set of types T1, T2, . . . , Ty to associate with each realm Ri such that the number of objects that will be created as a result in the association is minimized or reduced. For example, if the number of object that are of both type Ta and type Tb is large, one can place them in the same realm thus avoiding too many objects in the association. On the other hand, if Ta and Tb have few objects in common, they could be placed in separate realms.

Various methods of dividing a system into pieces are described in U.S. patent application Ser. No. 60/544,526 filed on Feb. 13, 2004 and entitled "Method and System for Topology Splitting," which is assigned to the assignee of the present application. U.S. patent application Ser. No. 60/544,526 is incorporated by reference herein in its entirety.

The model may, if desired, limit the propagation of behaviors to within a realm. This may be useful in cases where the processing to be performed on the model benefits from limiting the propagation of behaviors across realms to only those behaviors defined, e.g., as being critical. For example, consider an enterprise network with virtual circuits layered over a provider network. An analysis processing of the enterprise realm can use a model that defines problems in the virtual circuits layered over the provider network. Thus, events in the provider realm that relate to such virtual circuits can propagate to the enterprise realm. But other events, such as unrelated internal device port failures, can have their propagation constrained within the provider realm.

Realm-related manual or automated processing such as, e.g., processing of events through realms, can be distributed if desired across process and processor boundaries, e.g., to increase scalability. For example, consider a system with four realms R1, R2, R3, and R4; and four servers to process the model, S1, S2, S3, and S4. One can, e.g., allocate all processing related to R1 to S1, R2 to S2, R3 and R4 to S3 in different processes, and the associations between all realms to S4. Realms may thereby provide an easy way to distribute the processing related to the models (e.g., event propagation or analysis of root cause of symptoms) across servers or processes.

In accordance with one or more embodiments, an interface is provided that can allow details of one realm to be hidden from another. Accordingly, a user or system can select to selectively view only details that are of interest. The modeling system can include interfaces for visually displaying a system by displaying its composite realms, and enabling navigation within and across realms. This can include navigating across different levels of abstraction or different perspectives on the same component or group of components represented by different realms. In addition, the navigation among realms can be driven by the modeled system operations. For example, when an event occurs, the visualization can automatically navigate to the realm affected by the event.

Figure 6:
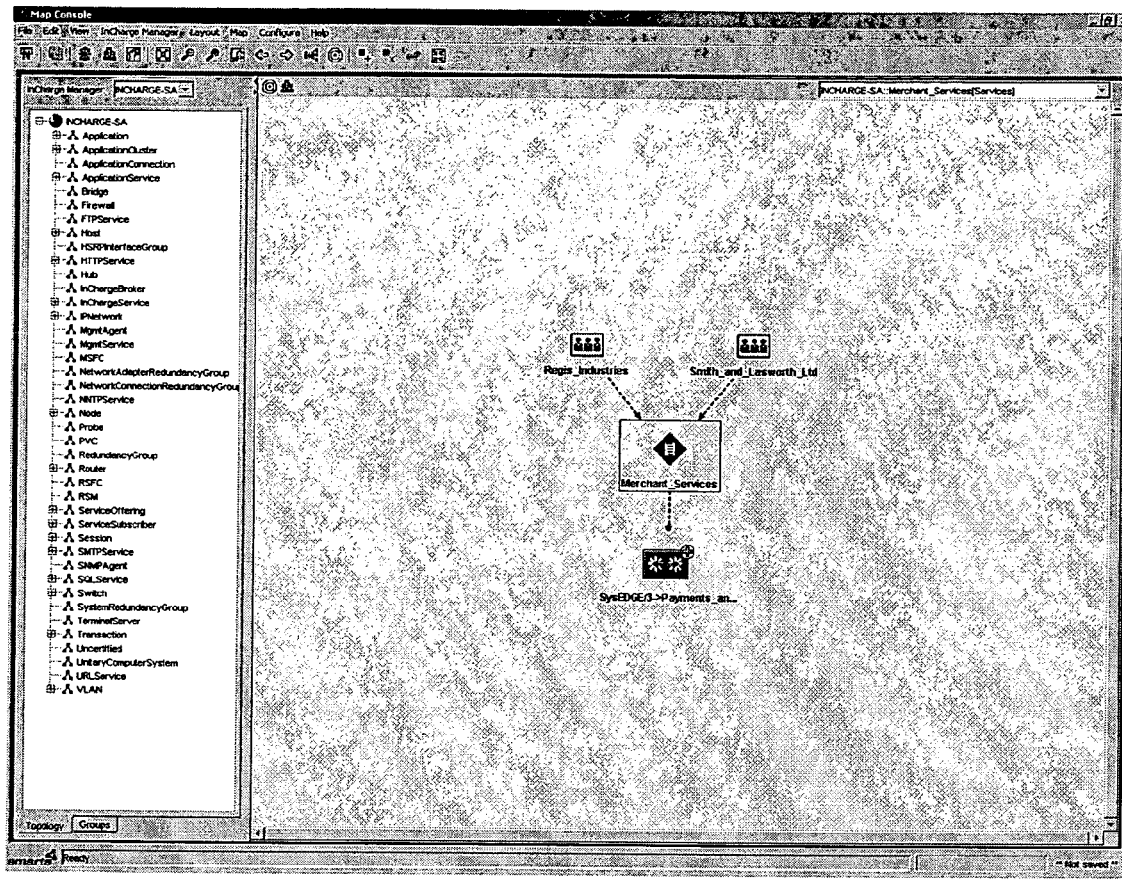
FIG. 6 is a representative screen shot providing a view of a business realm of an exemplary modeled system.
Figure 7:
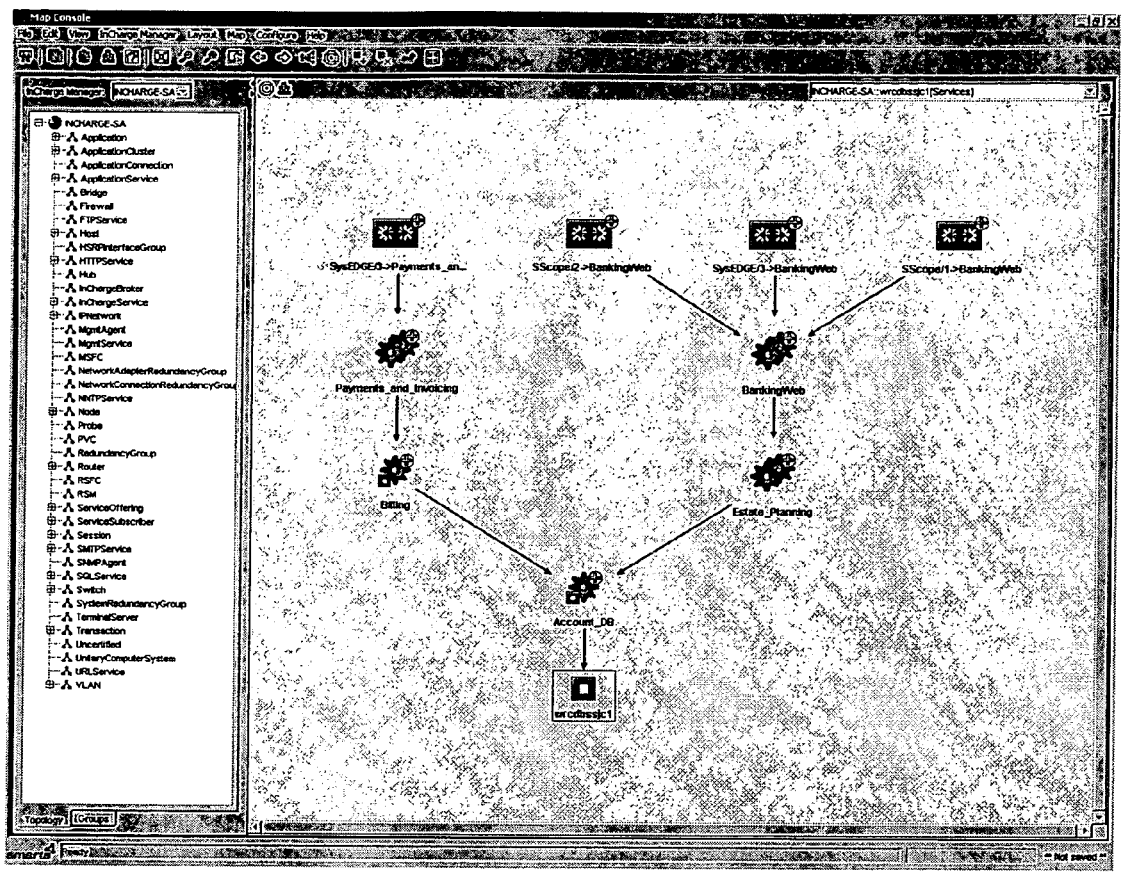
FIG. 7 is a representative screen shot providing a view of an application realm of an exemplary modeled system.
Figure 8:
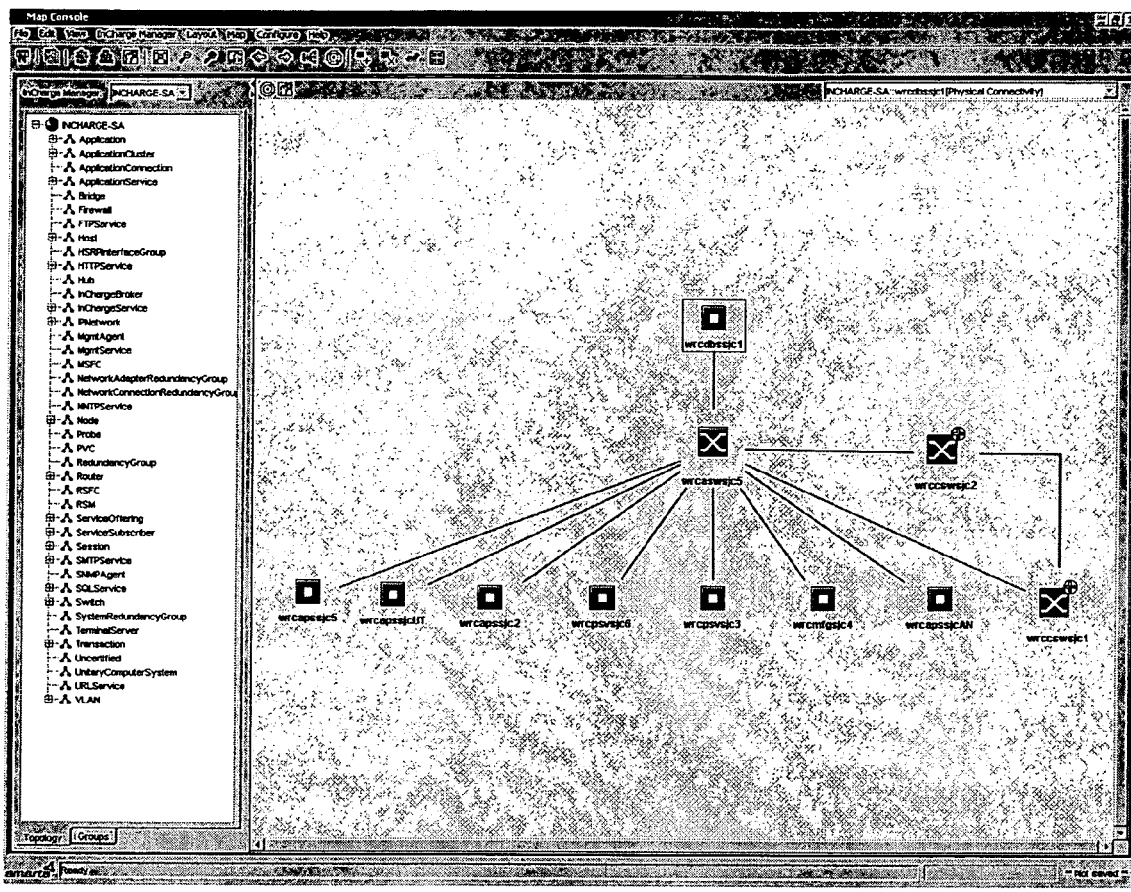
FIG. 8 is a representative screen shot providing a view of a physical connectivity realm of an exemplary modeled system.
Figure 9:
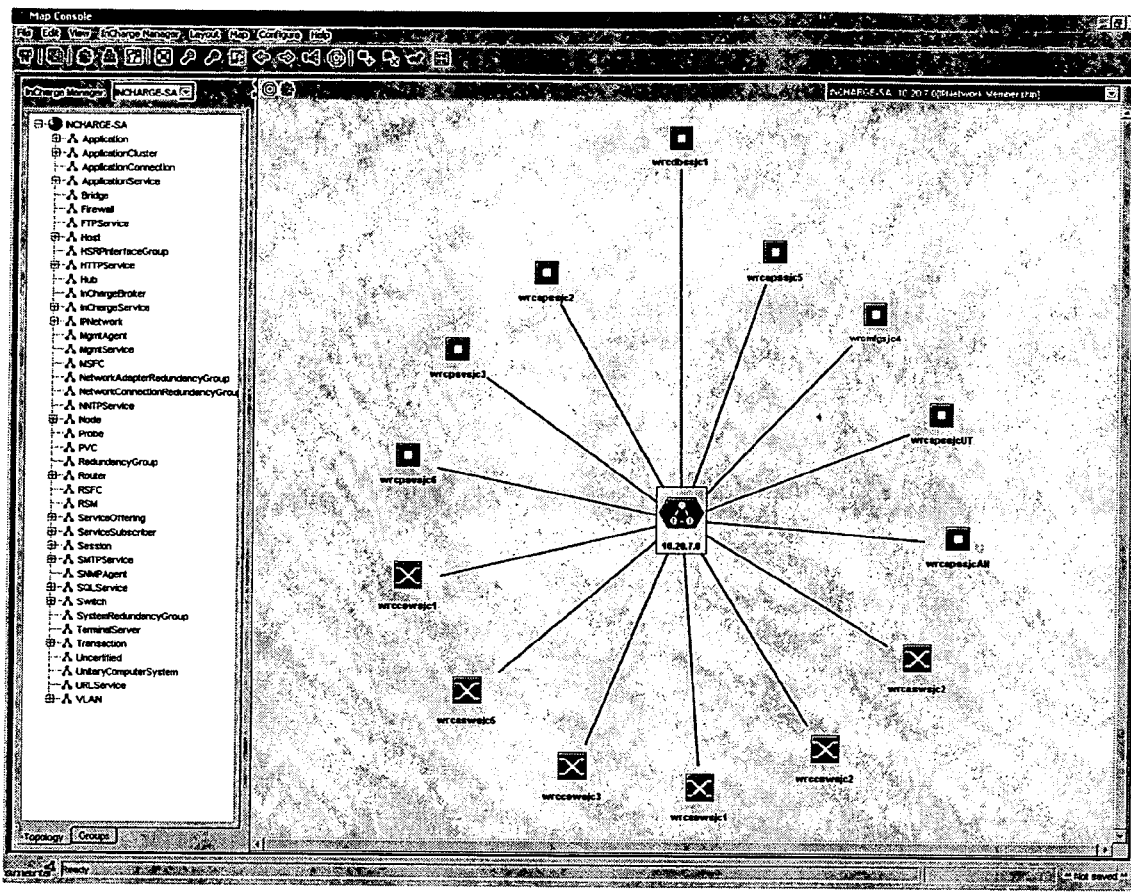
FIG. 9 is a representative screen shot providing a view of an IP realm of an exemplary modeled system.
Figure 10:
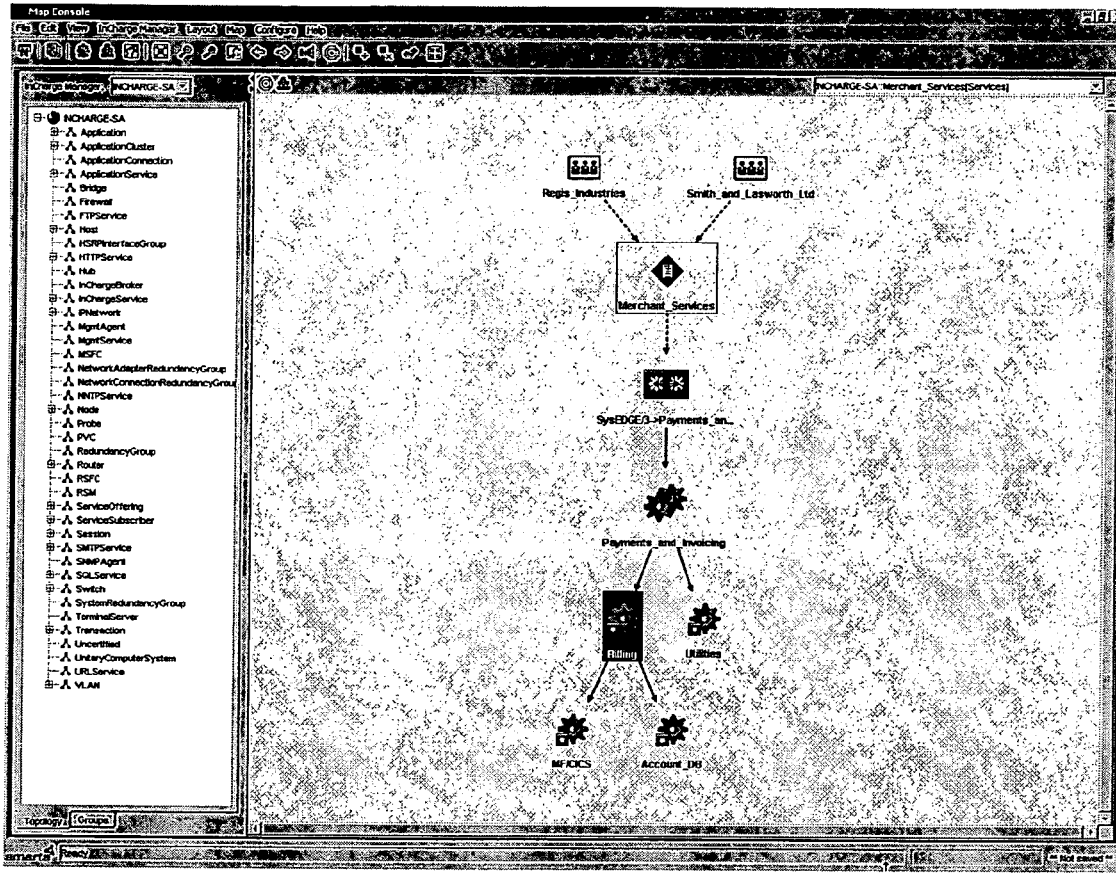
FIG. 10 is a representative screen shot providing a view of unified business and application realms of an exemplary modeled system.

For example, FIGS. 6-10 illustrate several exemplary screenshots that provide different views of the system based on the modeled realms. Different classes of objects (clients, applications, transactions, servers, etc.) can have unique icons to identify them. FIG. 6 shows an example of a Business Realm with two clients (Regis Industries and Smith & Lasworth) using a merchant service that includes a payment transaction. FIG. 7 shows a possible Application realm with several transactions (at the top) that are implemented by several applications (Payment and Invoicing, Web Banking, Billing, Estate Planning, and Account Database). The applications in turn are hosted by a server (at the bottom). The transaction objects provide the association between the Business and the Application realms. FIG. 8 shows the Physical Connectivity realm, where the server at the top is connected to a router (or switch), which in turn is connected to several other servers and routers (or switches). The connections are the physical links between these devices. The Application realm and the Physical Connectivity realm have the servers as associations. FIG. 9 shows an IP realm where servers and routers (or switches) are connected via an IP network. In this screenshot, the details of the IP network are not provided. The IP network is represented in a summarized fashion using a special icon at the center. The routers and switches provide the associations between the Physical Connectivity realm and the IP realm. The servers provide the associations between the IP realm and the Application realm. A user can use the associations to navigate between the realms in the graphical interface. Finally, FIG. 10 shows the unification of two realms: the Business and the Application in one view in the graphical interface. In each of the FIGS. 6-10 screenshots, the column on the left displays the classes and relationships in each realm.

As discussed above, inter-realm relationships can be represented by related objects and relationships between objects. In addition, special relationship objects can be defined to represent features associated with abstract entities, e.g., services such as Quality of Service (QoS), Service Level Agreements (SLA), etc. For example, a user application accessing a service may be represented using a relationship that captures, e.g., the service's mean response time, and average server throughput. Such features do not reflect physical or software components, but abstract attributes that can be an important part of the QoS delivered as perceived by the user.

The processing (e.g., propagation of behaviors) between realms using associations can occur in real-time with the operation of the system or can be applied off-line. Real-time processing can be important when the model is being applied to find, e.g., root causes for symptoms in the system. Off-line processing can be useful, e.g., for off-line system simulations, design decisions such as capacity planning, and other purposes.

MRSM can enable automatic creation of relationships and other associations between realms. When an object belongs to more than one realm, a relationship is implicitly created. In addition, relationships between realms can be automatically extracted from the related realms based on arbitrary matching criteria. For example, objects that have the same name N in realm R1 and realm R2 may represent the same component of the modeled system. One may thus automate the process of looking in each realm for objects that have the same name and create a relationship between realms such as R1 and R2 with the objects with the same name N as the associations. Other criteria for object matching are possible, including but not limited to, similar names, similar attribute names, similar object structures (similar number of attributes and types), similar object properties, similar relationships, etc. Such processes can be useful, e.g., to link objects that are visible at different realms with different properties. For example, in a network, one may be able to identify the same nodes in the physical, data link, and network layers by their name or serial number properties. In addition, one may be able to correlate the ports of the transport layer with the nodes in the network layer by looking at the port properties, which may include the node interface IP address, or identify all the channels layered over a particular T1 link.

The following are illustrative, non-limiting examples of MRSM applications in accordance with one or more embodiments of the invention.

Example 1

Database Service Model

Figure 11:
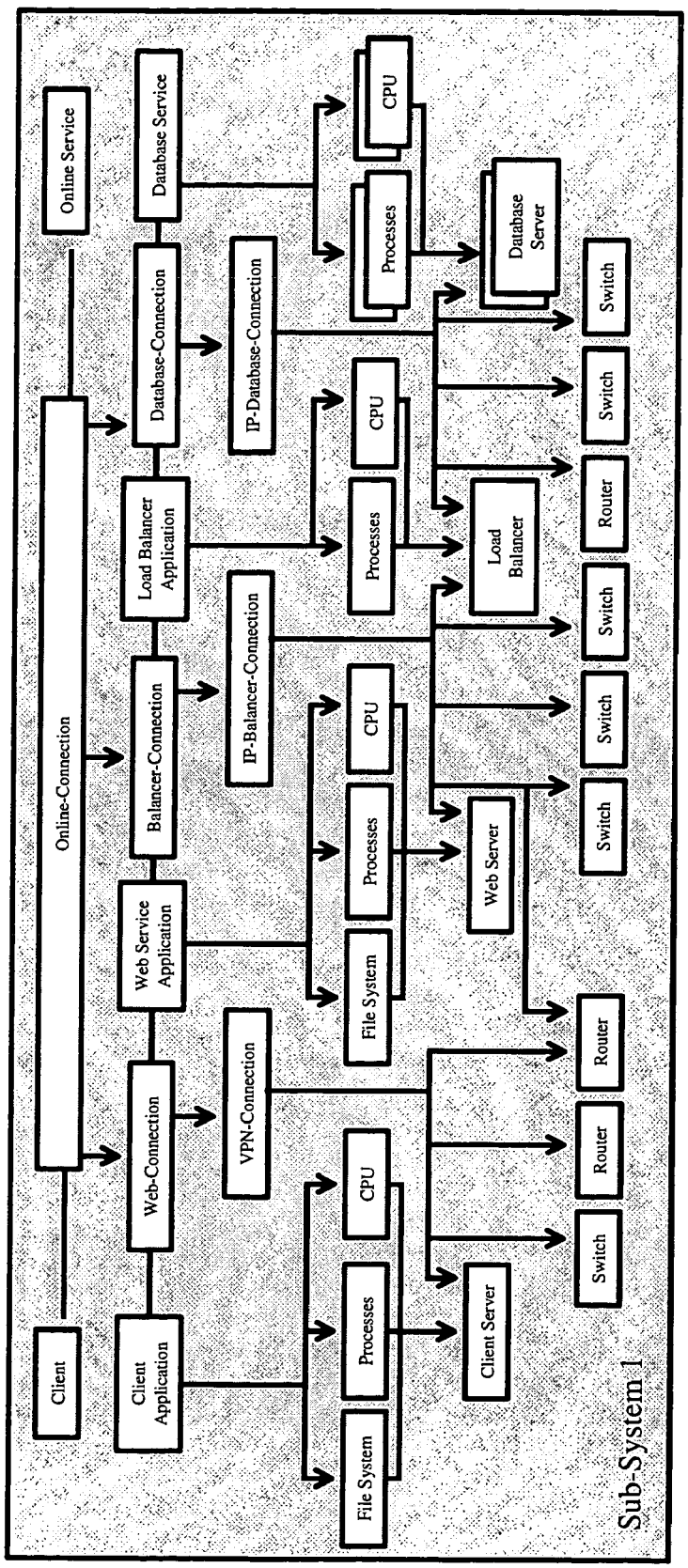
FIG. 11 is a diagram illustrating the Web-based query system of FIG. 1 with the addition of relationship objects.
Figure 12:
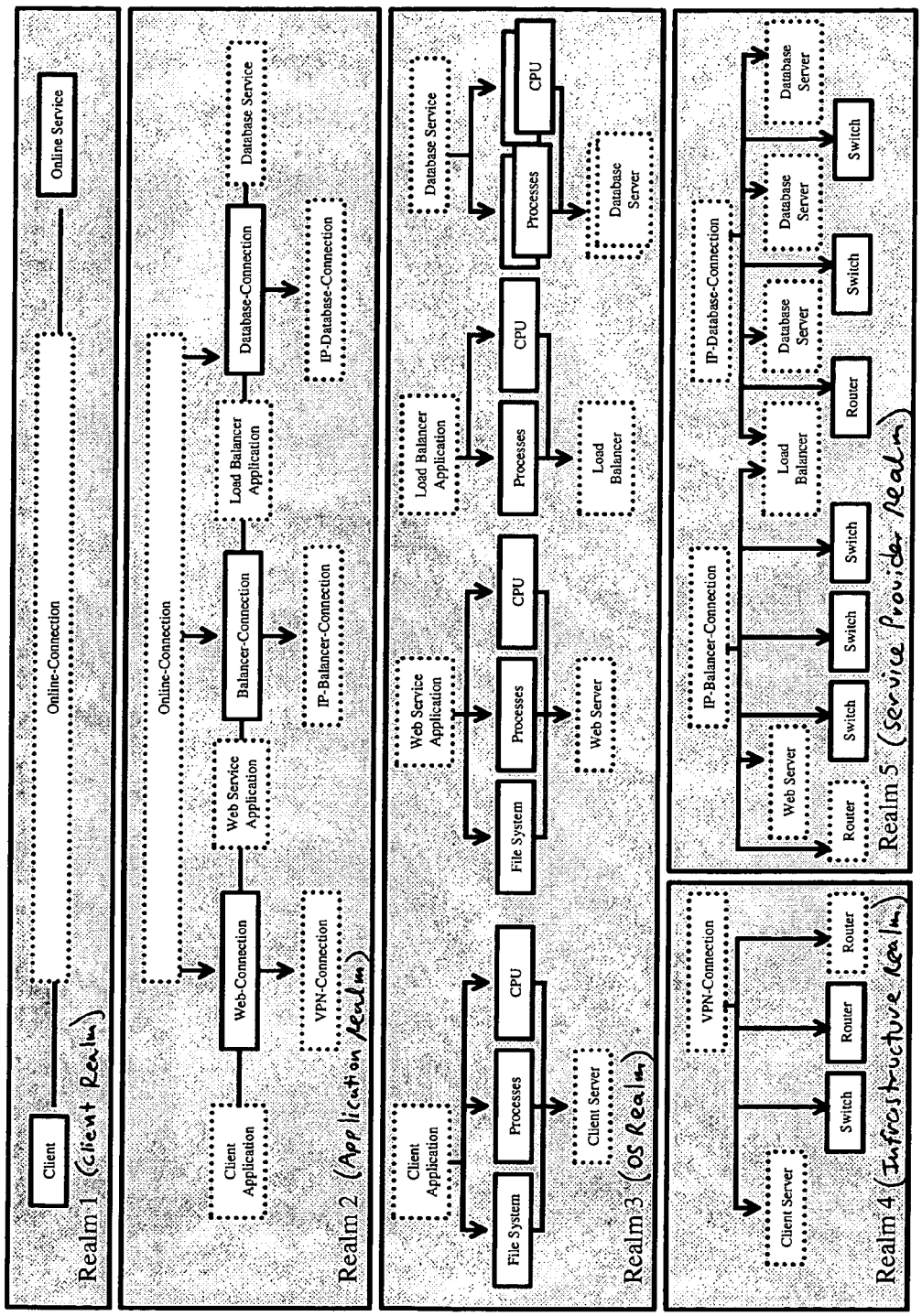
FIG. 12 is a diagram illustrating one possible partitioning of the Web-based query system into realms in accordance with one or more embodiments of the invention.
Figure 13:
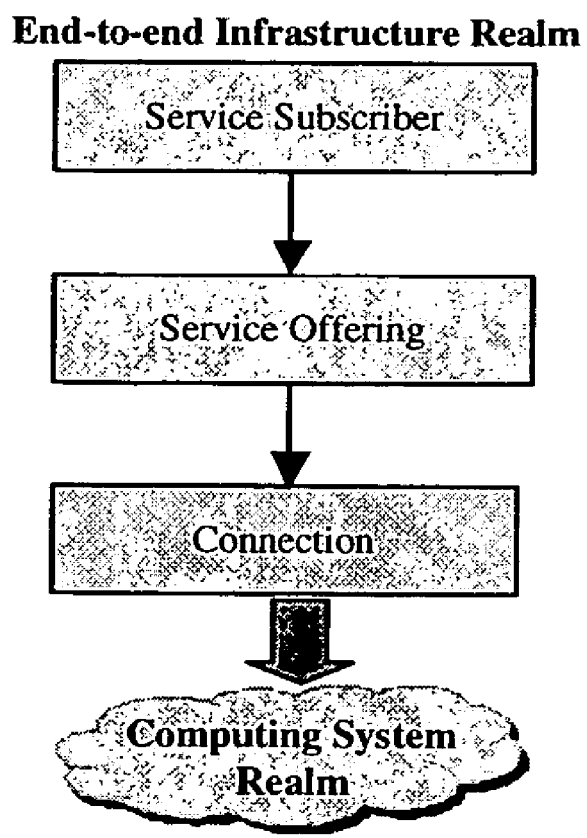
FIG. 13 is a diagram illustrating an end-to-end infrastructure realm of an end-to-end infrastructure management model.
Figure 14:
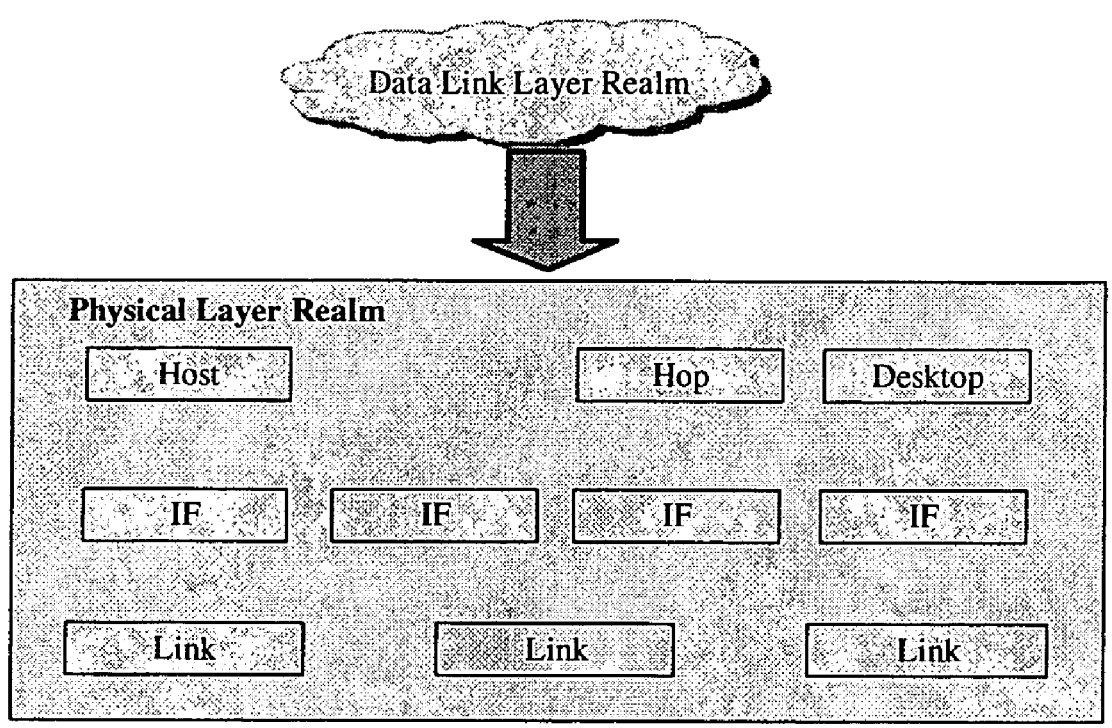
FIG. 14 is a diagram illustrating a physical layer realm of an end-to-end infrastructure management model.
Figure 15:
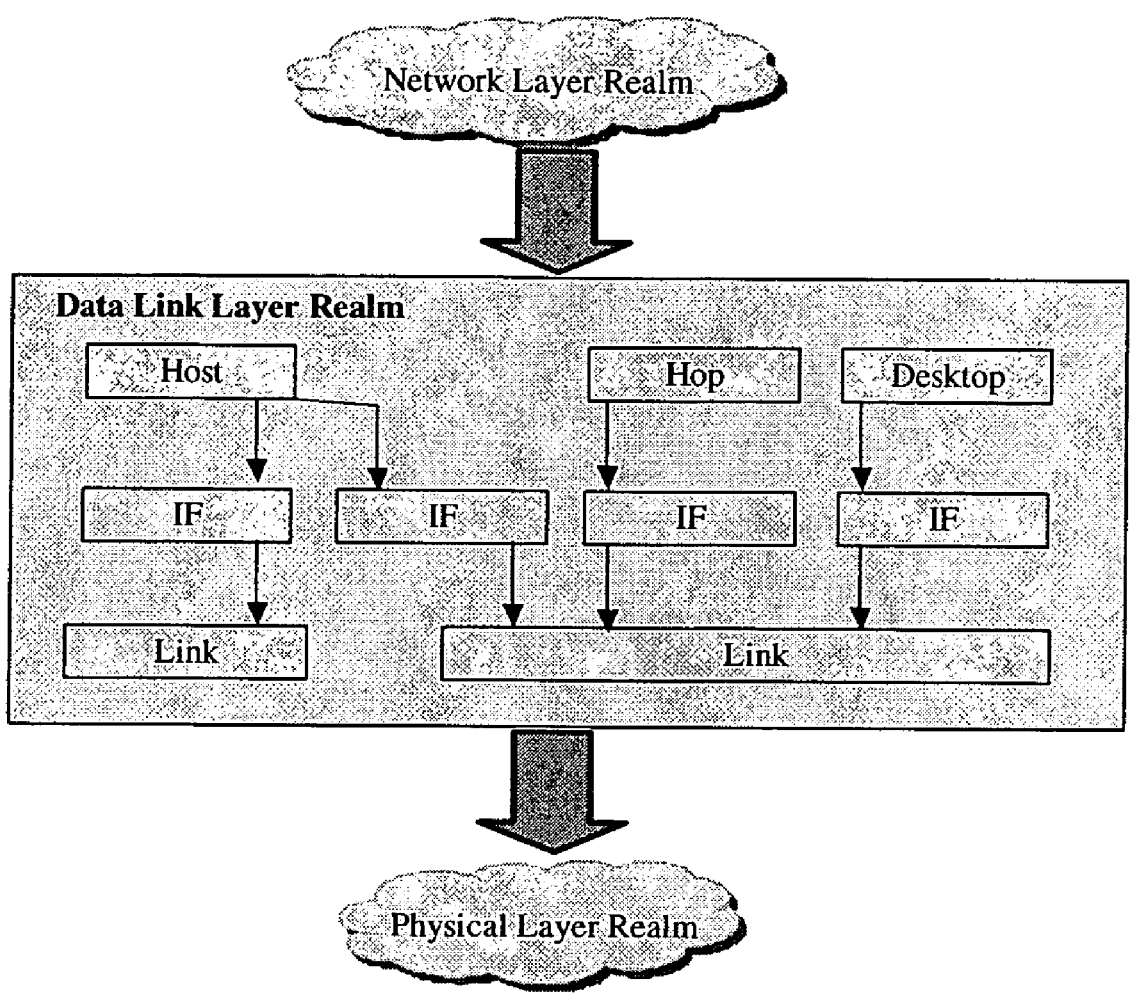
FIG. 15 is a diagram illustrating a data link layer realm of an end-to-end infrastructure management model.
Figure 16:
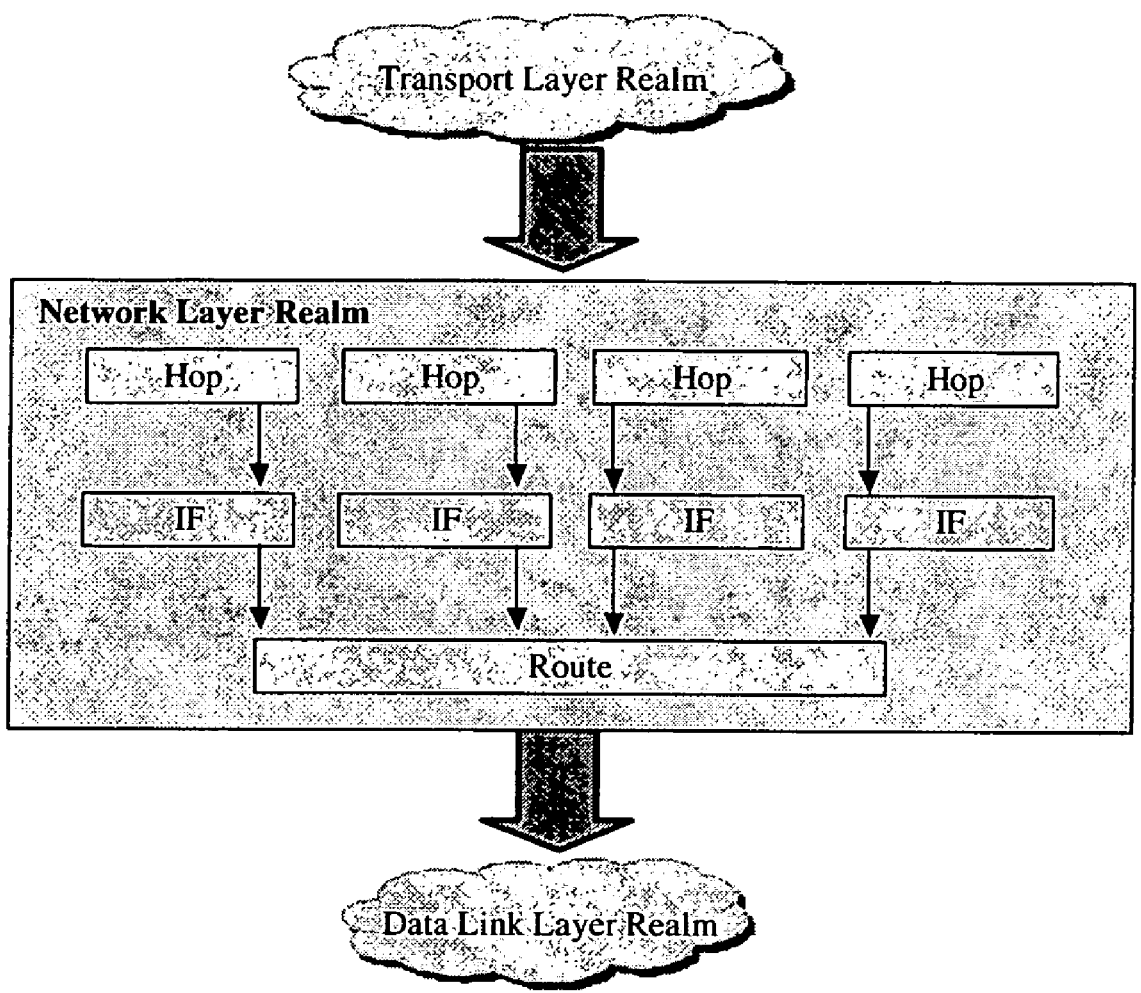
FIG. 16 is a diagram illustrating a network layer realm of an end-to-end infrastructure management model.
Figure 17:
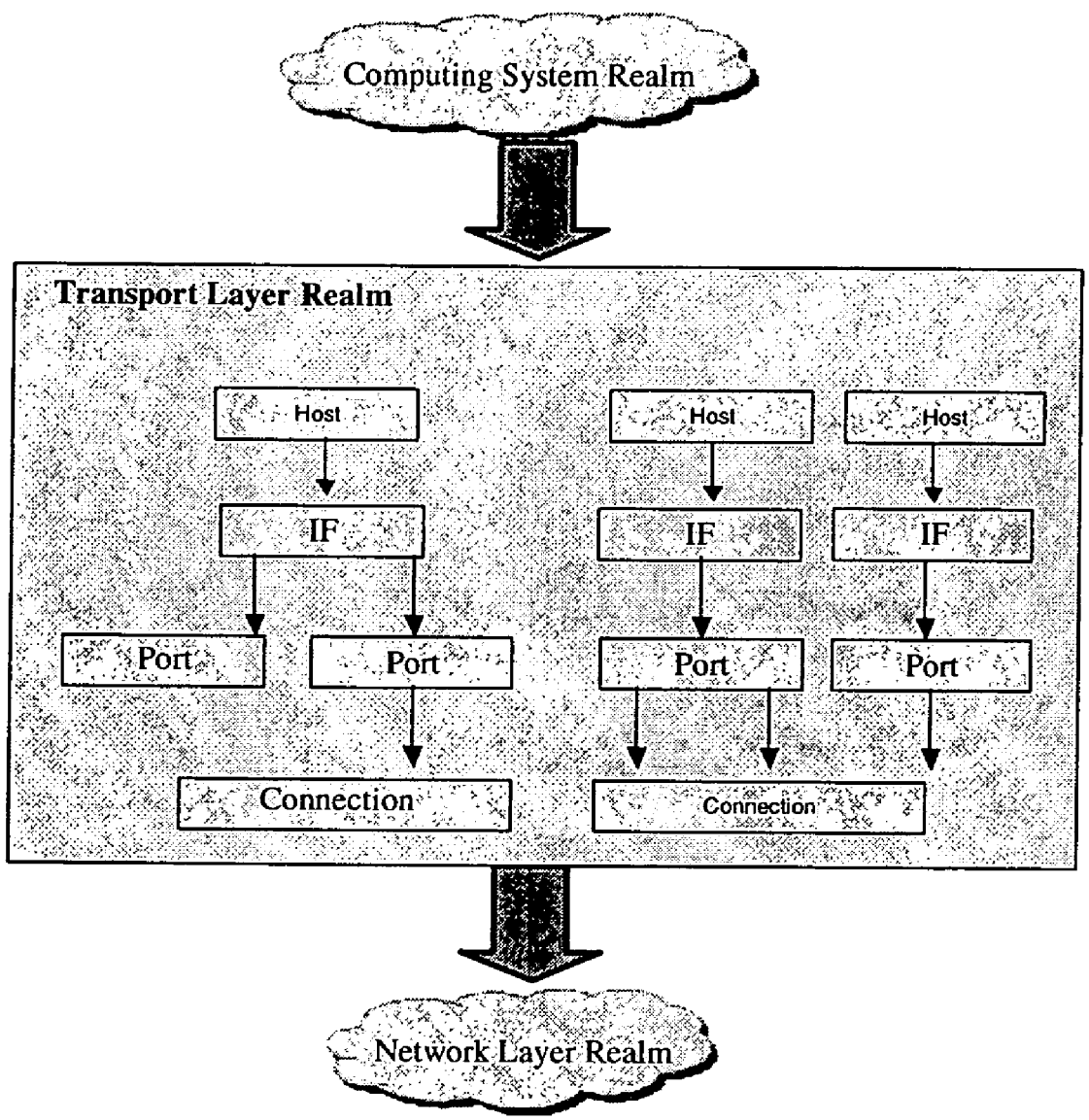
FIG. 17 is a diagram illustrating a transport layer realm of an end-to-end infrastructure management model.
Figure 18:
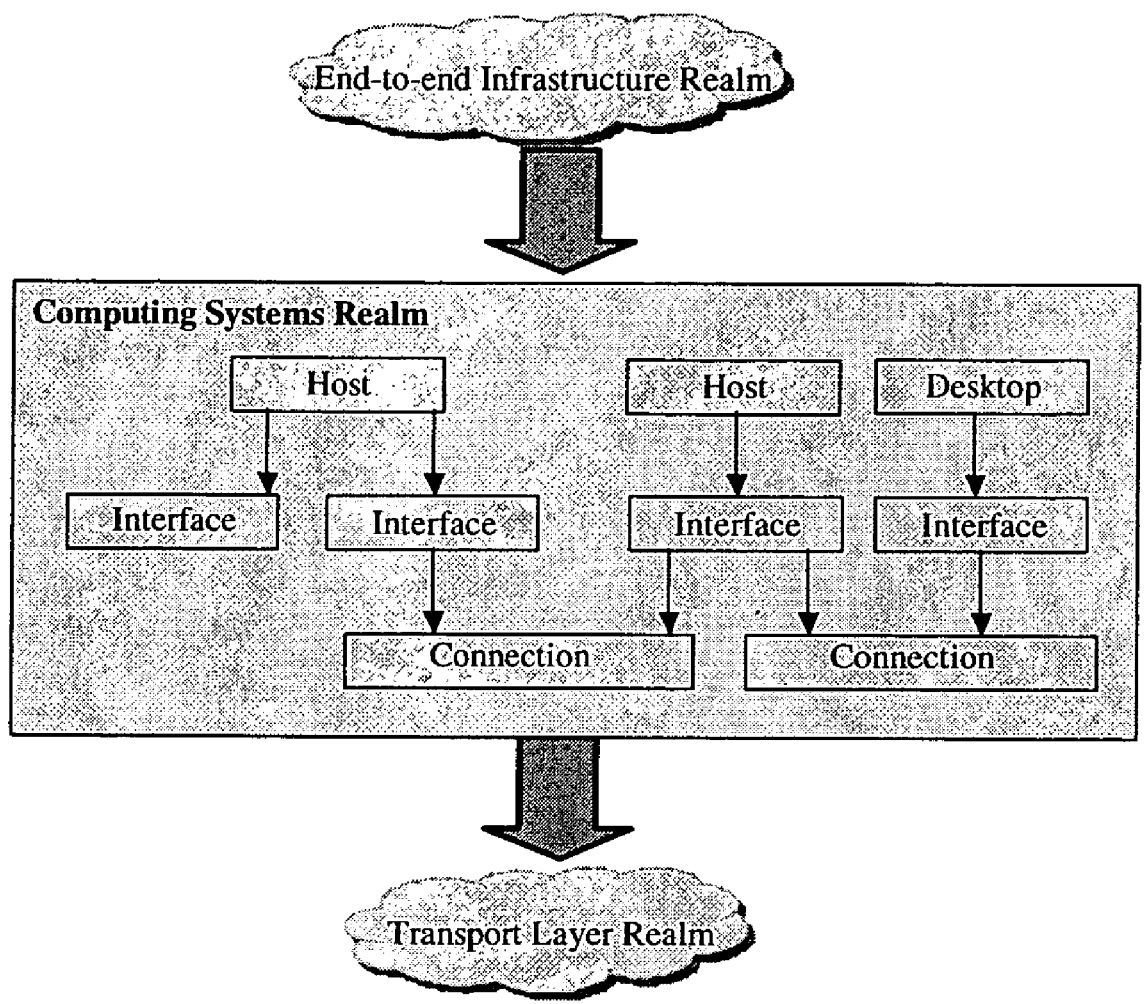
FIG. 18 is a diagram illustrating a computing systems realm of an end-to-end infrastructure management model.

A modeling method in accordance with one or more embodiments of the invention can be applied to the database service example shown in FIG. 1. One possible division of the system is generally depicted in FIGS. 11 and 12, which include the objects of FIG. 1 with the addition of relationship objects. Various other divisions are also possible depending on the particular division criteria selected.

FIG. 12 displays a possible definition of realms for the database service. In FIG. 12, a client realm (Realm 1) includes the client application and the client connection to the service. An application realm (Realm 2) includes the client application, the web server, the load balancer, and the database application. An OS realm (Realm 3) includes the scheduler, the processes, and the resource (memory and processor) allocations at each server. An infrastructure realm includes the VPN link and devices to support the VPN service between the client and the service (Realm 4). A service provider realm includes the service provider network equipment (routers, interfaces, links, etc.) and the servers (Realm 5). It is also possible to model the hardware realm (not shown) which could include server memory, processor, physical interfaces, etc. for each server.

This example illustrates several aspects of system modeling in accordance with one or more embodiments of the invention:

(1) A variety of techniques can be used to specify the realms, their objects, and their relationships in the system model. For example, various modeling languages can be used including, but not limited to, MODEL, CIM, CORBA, UDL, XML, etc. CIM, e.g., includes a collection of classes that can be used to represent common system objects and their properties. Alternatively, a programming language such as C, C++, Java, and Smalltalk can be used. In addition, a graphical tool such as a CAD (computer-aided design) editor can be used for the modeling.

(2) The system can be divided along different component or collection of component boundaries based on any desired division criteria. The criteria can depend on, e.g., how one wants to define the relationship between realms, who is responsible for each realm, and what type of processing is to be done on the system. For instance, in the FIG. 12 example, one could additionally define a customer realm that includes users of the system to allow analysis processing, e.g., of the business impact of behaviors of the system.

(3) In addition to the models of each realm and their internal relationships, the relationships between realms are modeled to create associations. The relationships can be of different kinds, including, but not limited to the following:

(a) Associations can be made between separate objects of two realms. For instance, in the FIG. 12 example, the client-web server connection at Realm 2 may depend on a switch at Realm 4. The dotted rectangles depict relationships. Connections can be objects in the model and can represent relationships with other objects. For example, the "Online-Connection" relationship object is related to "Balancer-connection", which relates to switches in Realm 5.

(b) Associations can be made by the same (or similar) object(s) at different realms. For instance, in the FIG. 12 example, a database server IP interface in Realm 2 (application realm) is also the IP interface on the Ethernet card at Realm 5 (network realm). The level of detail (or attributes) of the same objects represented at different realms may vary.

(4) The modeling can also define explicit relationships between objects within a realm. These objects may, e.g., be abstract entities that do not reflect any hardware or software components. For example, the relationship between the client and the service ("On-line connection") is an abstract entity that represents the attributes of the client-service relationship. It may, e.g., capture the quality of the service (conformance to SLA, response time, throughput, etc.).

(5) Semantics are associated with relationships. For instance, in the FIG. 8 example, an application may be related to a server by a "runs-on" relationship. A relationship between a client and a server can, e.g., have a minimal-response-time attribute.

(6) Associations can serve as conduits to break processing on the system into processing on realms and combining the results. For example, a processing may compute causal propagation of behaviors within a realm. The propagation of behaviors between realms is performed via the associations. Additionally, various correlation mechanisms (such as rule-based mechanisms, blackboard mechanisms, probabilistic mechanisms, or codebook correlation) can be used to correlate behaviors.

(7) Specific processing may be automated. There are several possible applications of this concept, including, but not limited to, the following:

(a) The processing related to integration and correlation of information across realms can be automated. For example, determining the root cause of symptoms appearing in different realms. One could correlate a hardware failure in Realm 5 with service degradation in Realm 1 to determine the root cause of poor client query response time. Various types of correlation analysis can be performed including, e.g., a rules based analysis and a codebook correlation analysis. Examples of codebook correlation analysis are provided in U.S. Pat. Nos. 5,528, 516; 5,661,668; and 6,249,755 which are incorporated by reference herein.

(b) The processing related to capacity planning across realms can be automated. For example, one could compute how many application services to run on a server based on the server hardware and network configuration (Realm 5) and the client average query load (Realm 1).

(c) The processing related to simulating what-if scenarios, e.g., for the purpose of designing fault tolerance into the system can be automated. Such scenarios can be simulated, e.g., by generating artificial events and analyzing their impact in various parts of the system.

Example 2

Generic End-to-End Infrastructure Management

One of the long-standing difficulties in the enterprise management space is managing the infrastructure end-to-end to optimize performance and availability of IT-dependent business services. The challenge is that the technology domains (applications, security, databases, servers, storage, network equipment, network protocols, etc.) are tightly intertwined, and thus behaviors propagate across these domains. Managing infrastructure end-to-end requires understanding the individual objects, the individual realms, behaviors, and how they propagate across related objects and related realms. An example of the use of MRSM in accordance with one or more embodiments of the invention for managing end-to-end infrastructures is as follows:

The infrastructure can be modeled and divided into the following realms: (1) physical network objects and their relationships; (2) data link layer objects and their relationships; (3) network layer objects and their relationships; (4) transport layer objects and their relationships; and (5) computing systems: hosts and desktops.

FIGS. 13-18 show some of the possible objects in each realm. The Physical Layer realm (shown in FIG. 14) can contain a detailed description (using attributes) of each physical device, including hosts, desktops, network hops (routers, switches, etc.), physical links, interfaces (IF), etc. The Data Link Layer realm (shown in FIG. 15) can contain connectivity information among the physical devices (physical links). It also may add attributes such as the type of line protocol the devices use, media access scheme, etc. The Network Layer realm (shown in FIG. 16) can contain routes between devices (hosts, desktops, and hops). The Transport Layer realm (shown in FIG. 17) can contain end-to-end connectivity information between ports at the hosts and desktops at both ends. The Computing System realm (shown in FIG. 18) can provide summarized information about the attributes of hosts and desktops, their ports, and connectivity (connection) between them.

The End-to-End realm (shown in FIG. 13) relates a Service Subscriber (client) to a Service Offering (a specific service offered to the client). The service, in turn, includes one or more connections implemented using the Computing System objects in a Computing System realm.

Each of the infrastructure realms is responsible for a portion of the end-to-end system. The overall infrastructure is a result of linking together all of the above realms into a coherent semantic whole.

Some possible MRSM associations for linking together these realms for end-to-end management are as follows: The Data Link Layer realm can be linked to the Physical realm through a new relationship called "relayed_by" between a link (e.g., cable) and MAC addresses (e.g., the interface address). The Data Link realm can be related to the Network Realm through modeling a common interface (IF) object. The object model can include MAC attributes in the data link layer and IP attributes in the network layer. The Computing Systems realm can be linked to the Transport Layer realm using a connection object that enables a service connection. The Computing Systems realm can also be linked to the physical realm through the host and desktop common objects. These objects can have different attributes in the physical realm and in the Computing Systems realm. For example, the physical attributes such as electric properties will be attributes of the physical realm. Inventory attributes such as the purchase date and the price can be attributes of the Computing Systems realm.

Figure 19:
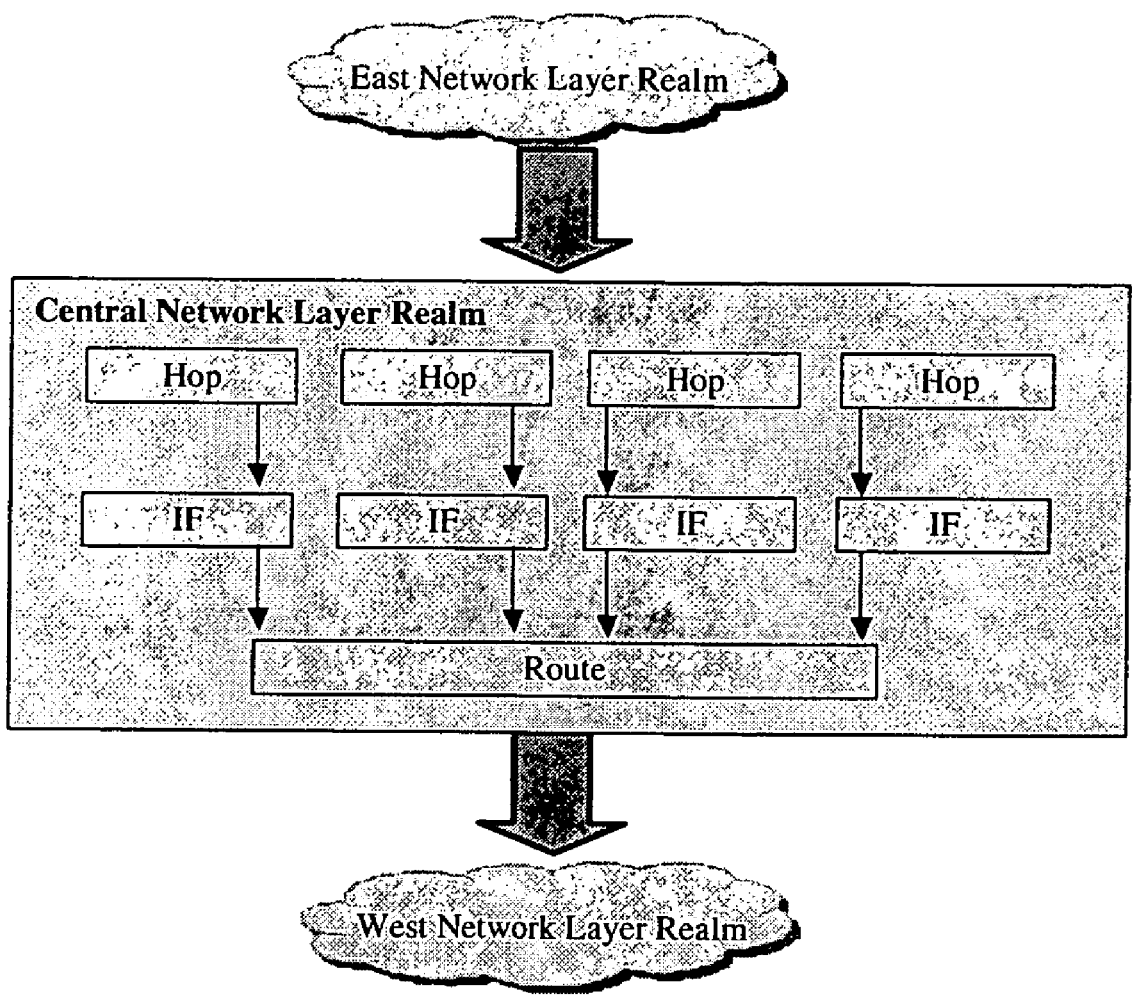
FIG. 19 is a diagram illustrating a central network layer realm of an end-to-end infrastructure management model.

Another possibility of dividing this infrastructure is to further divide any of the infrastructure layers, e.g., the Network Layer realm, into multiple realms. Examples of where this can be useful is in a large, geographically distributed network where each geographical region could be represented by a different realm. FIG. 19 illustrates one possible division. Another possibility is to divide by different network technologies such as ATM/Frame Relay, IP, optical.

One way of linking the geographically dispersed realms is by identifying a common object, e.g., a network device or hop, that appears in each of two related realms, and serves as the association. When the realms are linked together, many of the details of object models within individual realms can be abstracted, and objects in associations unified, providing a single semantic for the overall system. Because of the unification, processing performed in separate realms can have their results combined via the associations into a system wide result.

Example 3

Applications and Business Services Management Model

Figure 20:
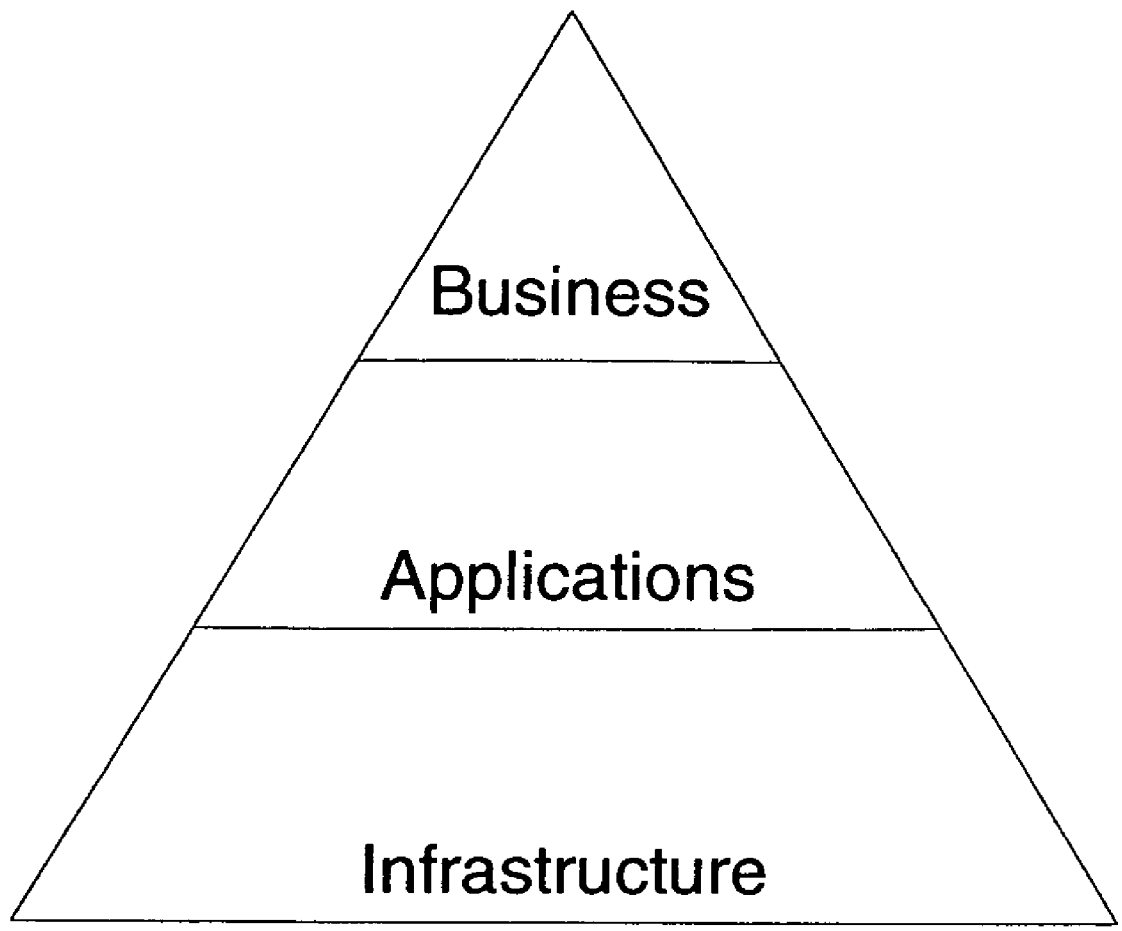
FIG. 20 is a diagram illustrating a generic enterprise management system.

Another long-standing challenge in the enterprise management space is managing the infrastructure to optimize business performance. Business performance can be tightly dependent on the underlying end-to-end IT infrastructure, which can include applications, databases, servers, storage, network equipment, etc. To drive the management of IT by business objectives requires understanding the complex web of relationships within and across subsystems, and understanding how behaviors propagate, not only within the infrastructure, but also across applications, services, and users. FIG. 20 depicts a generic enterprise management system. The triangle shape depicts different layers or division of the overall system into business processes, applications that support business processes, and the IT infrastructure that, in turn, supports the applications. Furthermore, business services are intimately dependent on their supporting technology domains. For example, a configuration problem in a firewall may propagate symptoms to result in poor application performance, which in turn, reduces the performance of the supported business service. For example, if the business service is on-line shopping, the number of on-line purchases could be reduced. One or more MRSM embodiments could be applied to the system by creating realms to model each layer, or portions of a layer, of the triangle. The associations between realms can represent several components of the system. For example, a model of server could link the application realm and the infrastructure realm by relating the application with the server where it runs. The business process realm and the application realm can be linked by using the business service implemented by the application, e.g., a service provider e-mail service related to e-mail server application that implements it. Another possibility in the definition of realms is to divide the system along horizontal or vertical lines within each layer. For example, one could divide geographically the infrastructure layer according to the location of the devices. The application layer could be vertically divided according to different tiers of the applications.

An example of the use of modeling in accordance with one or more embodiments of the invention for managing application services is described below. The modeling technique can be used for management of virtually any service that is delivered through a collection of cooperating distributed software processes. The term "application service" denotes such a service. Examples include, but are not limited to, the Domain Name Service (DNS), Internet mail, web application servers, distributed database, online shopping, travel reservations, program trading, and others. The following example shows one possible use of MRSM to define the realms and the relationships of an application service.

The application service objects can, e.g., be divided into the following realms: (1) a service assurance realm containing objects representing the service offerings and subscribers (part of the business layer in the triangle in FIG. 20); (2) an application services realm containing objects representing the application services (part of the application layer in the triangle in FIG. 20); (3) a server/OS realm containing objects representing the server and OS objects (part of the infrastructure layer in the triangle in FIG. 20); and (4) a network realm containing the network infrastructure objects (part of the infrastructure layer in the triangle in FIG. 20). Each realm is responsible for a portion of the end-to-end application service.

An Application Service Provider (ASP) (internal enterprise IT or external service provider) offering a reliable messaging service is provided as an example below to illustrate possible realm partitioning.

Figure 21:
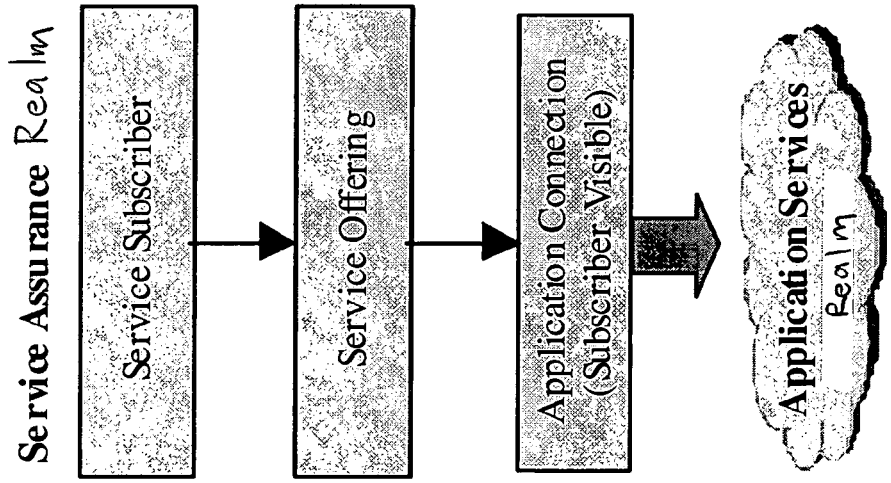
FIG. 21 is a diagram illustrating a service assurance realm of an application service model.

The Service Assurance realm and its components are depicted in FIG. 21. A consumer of the messaging service is represented by a service subscriber, a service offering represents the contract between the subscriber and the ASP, and an application connection models the performance of the service from the perspective of the subscriber.

The Service Assurance realm does not know the technology that implements the messaging service. It knows only the application connection, and it knows the performance of the connection represents the performance of the service offering. The application connection is an abstract relationship object added to represent the underlying messaging service and its health. It may contain attributes that indicate the performance of the service such as, e.g., response time, throughput, etc.

Figure 22:
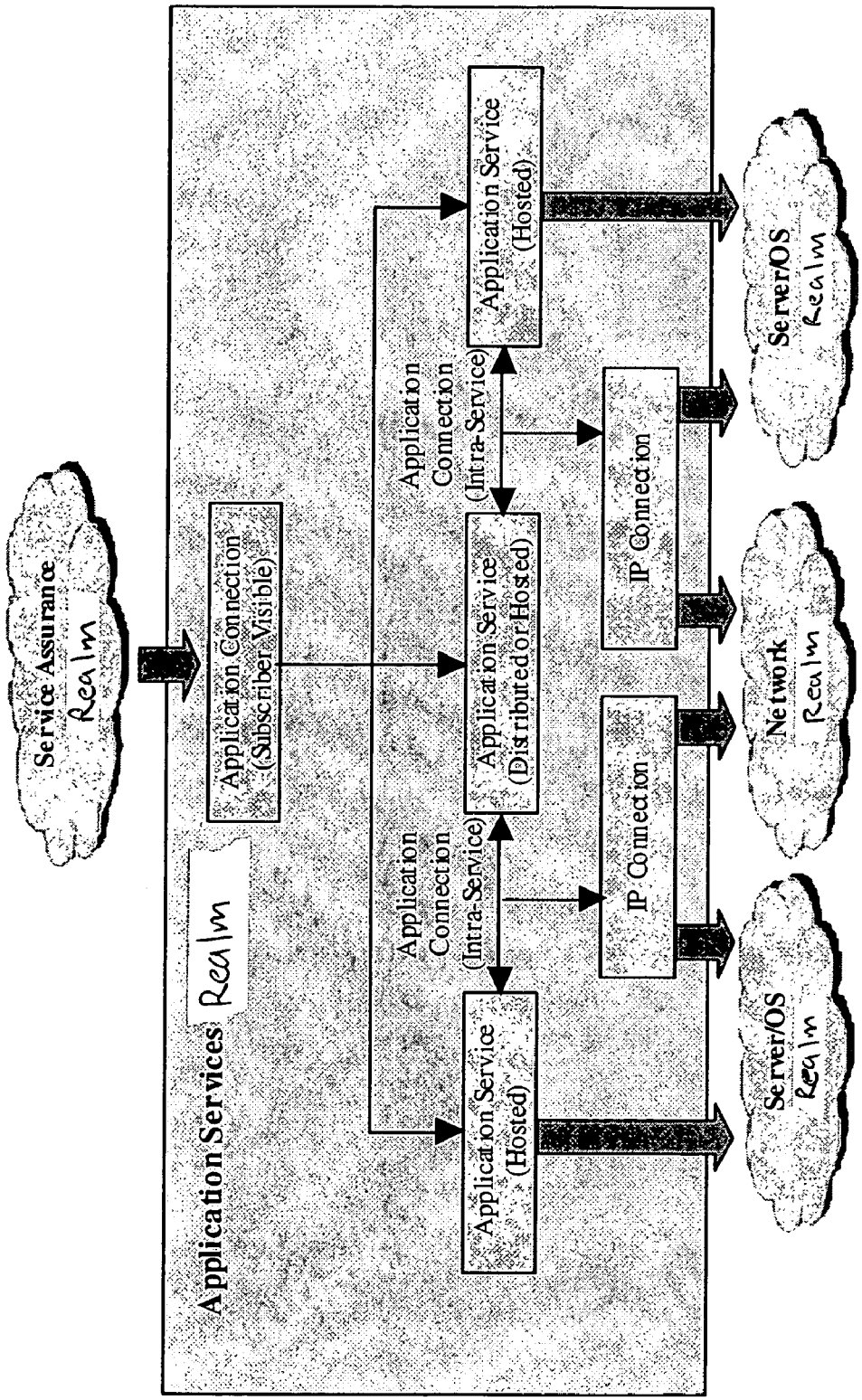
FIG. 22 is a diagram illustrating an application services realm of the application service model.

The messaging service may include several cooperating applications: a queuing service for reliable delivery, a directory service supporting the load balancing, and a security service that ensures privacy and integrity. The application services realm models the application services and the connections between them, as depicted, e.g., in FIG. 22.

An application service can take many forms. For example, it can be a distributed service that aggregates several services into a single, logical service, thus containing modeled realms internally; or a hosted service that represents a single service instance running on a server.

The Application Services realm understands the layering relationship between an application connection and the inter-server IP connections that support it. The IP connection abstracts the details of the network. The performance and availability of the network is measured by the performance and availability of the connection.

Figure 23:
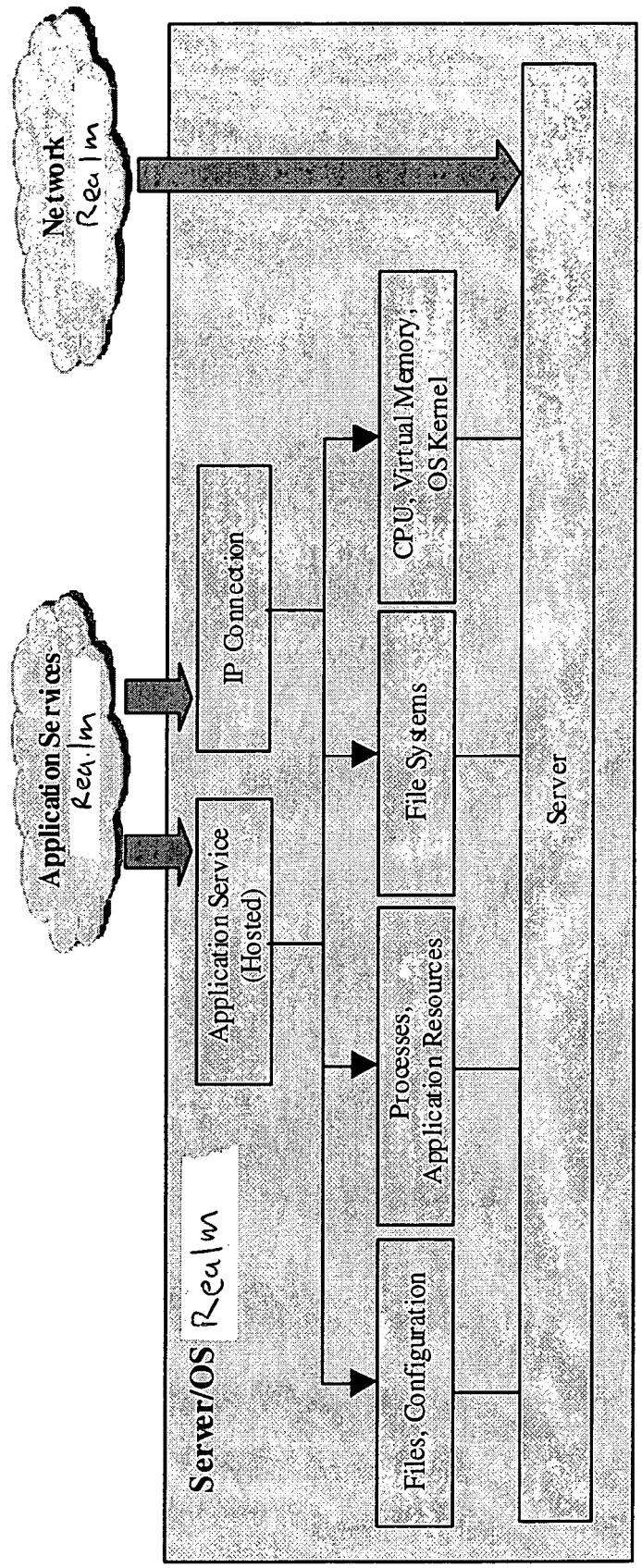
FIG. 23 is a diagram illustrating a server/OS realm of the application service model.

A server/OS realm shown in FIG. 23 models the hosted application service software components and their dependencies, the underlying OS kernel, and the associations between OS resources and the physical components that implement them, such as computer systems and I/O devices.

Problems in any of these areas may affect the hosted service. For example, server or OS problems may impact the IP connectivity between servers. A hardware crash, a faulty network interface, or excessive processor consumption all may affect IP connectivity.

Figure 24:
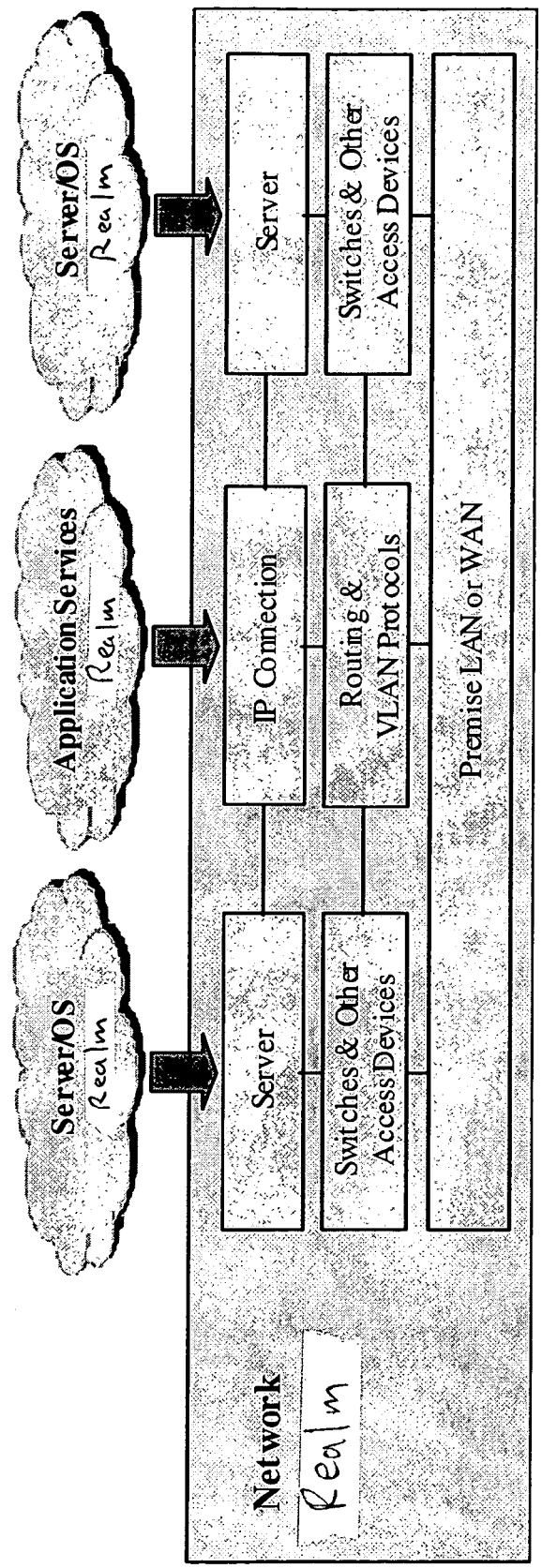
FIG. 24 is a diagram illustrating a network realm of the application service model.

A network realm shown in FIG. 24 can understand the detailed network infrastructure up to the level of point-to-point IP connections between servers hosting application services.

The associations between the realms are provided by common objects in several realms in the figures. For example, the association between the application service realm and the server/OS realms is the common objects representing the IP connection, or the common objects representing the application service. The association between the server/OS realm and the network realm are the common objects representing the servers. The association between the application services realm and the network realm are the common objects representing the IP connection. The association between the service assurance realm and the application services realm are the common objects representing the application connection.

The servers hosting the queuing, directory, and security services may be interconnected by LAN or WAN devices such as switches and routers. Failures in network components such as cables, cards or routing protocols may affect the IP connectivity supporting the application services.

Example 4

Independent Network Domains

Enterprises that are geographically spread typically use a service provider to consolidate dispersed regional networks. For example, as enterprise that has branch offices in California, New York, and Florida may use a service provider to connect the branches into a company-wide integrated network service. This service provider may be internal or external.

Figure 25:
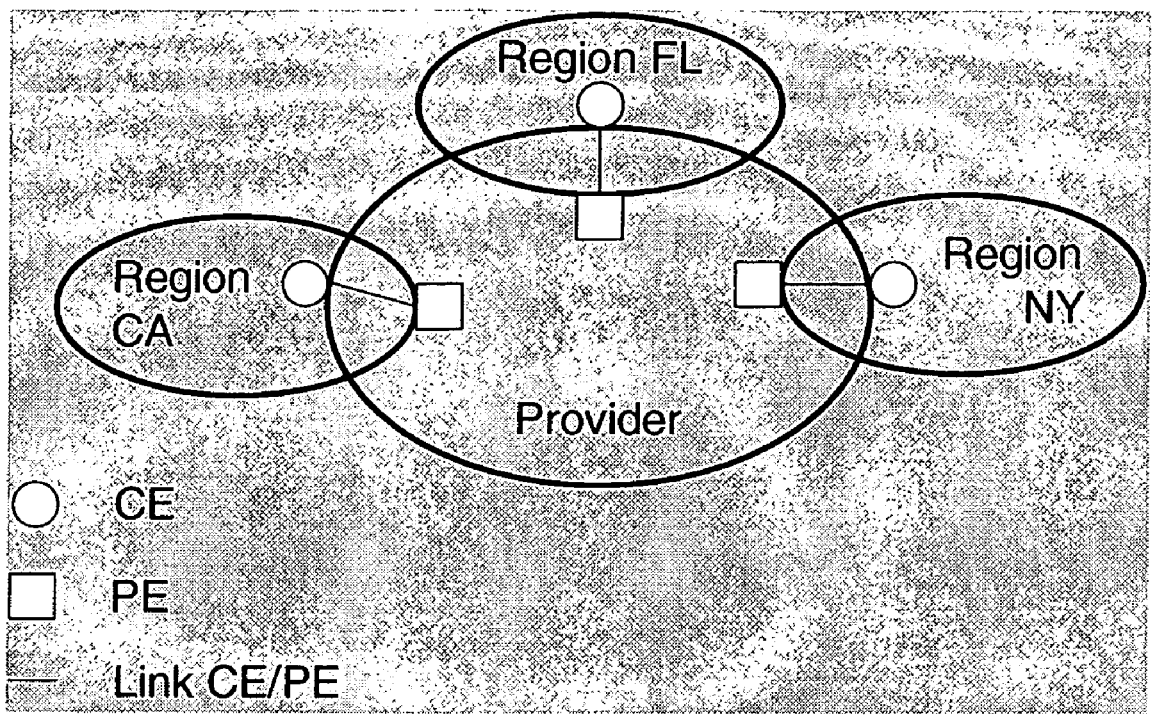
FIG. 25 is a diagram generally illustrating a model of an enterprise.
Figure 26:
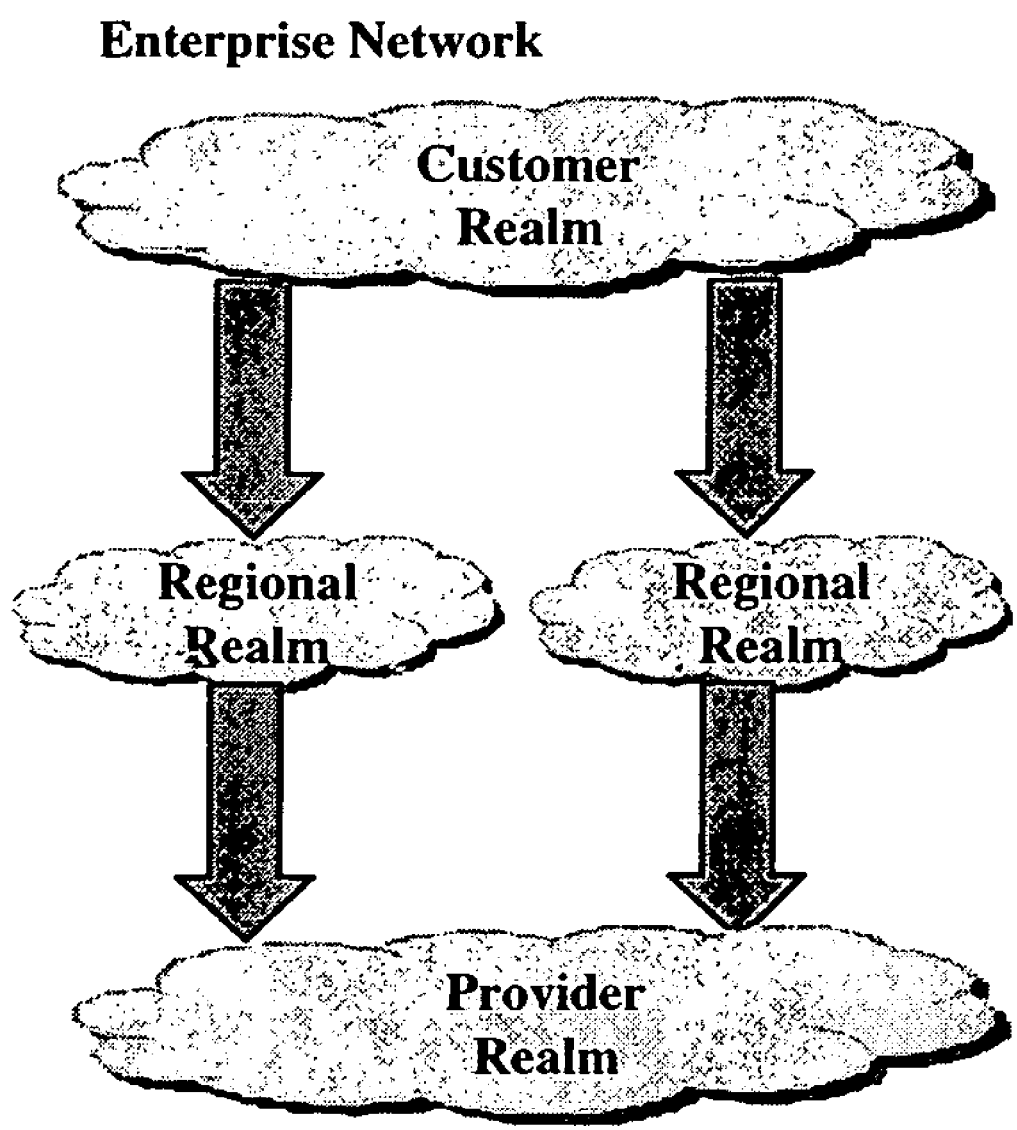
FIGS. 26, 27, 28, and 29 are diagrams generally illustrating associations between realms in the enterprise model.
Figure 27:
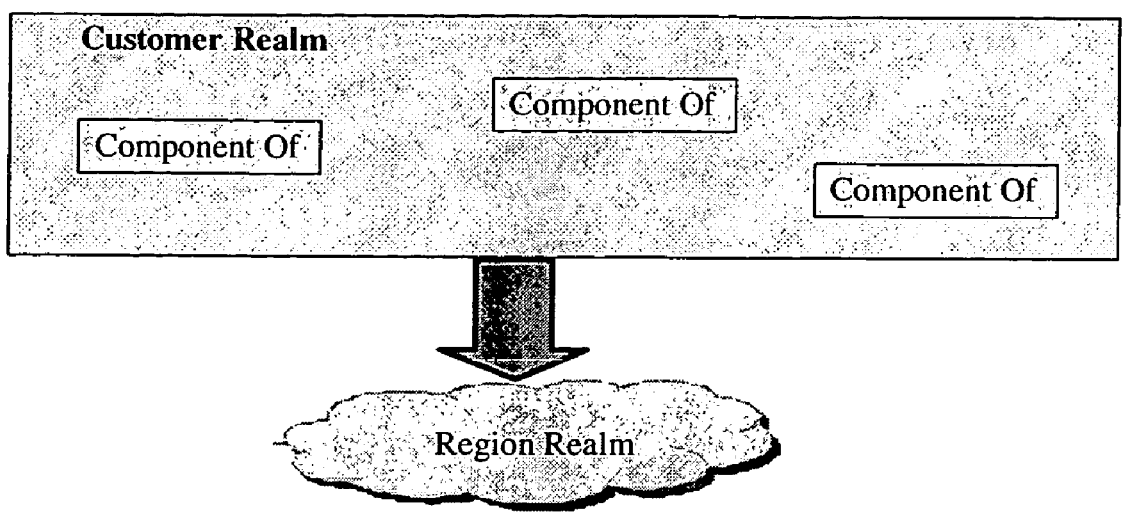
Figure 28:
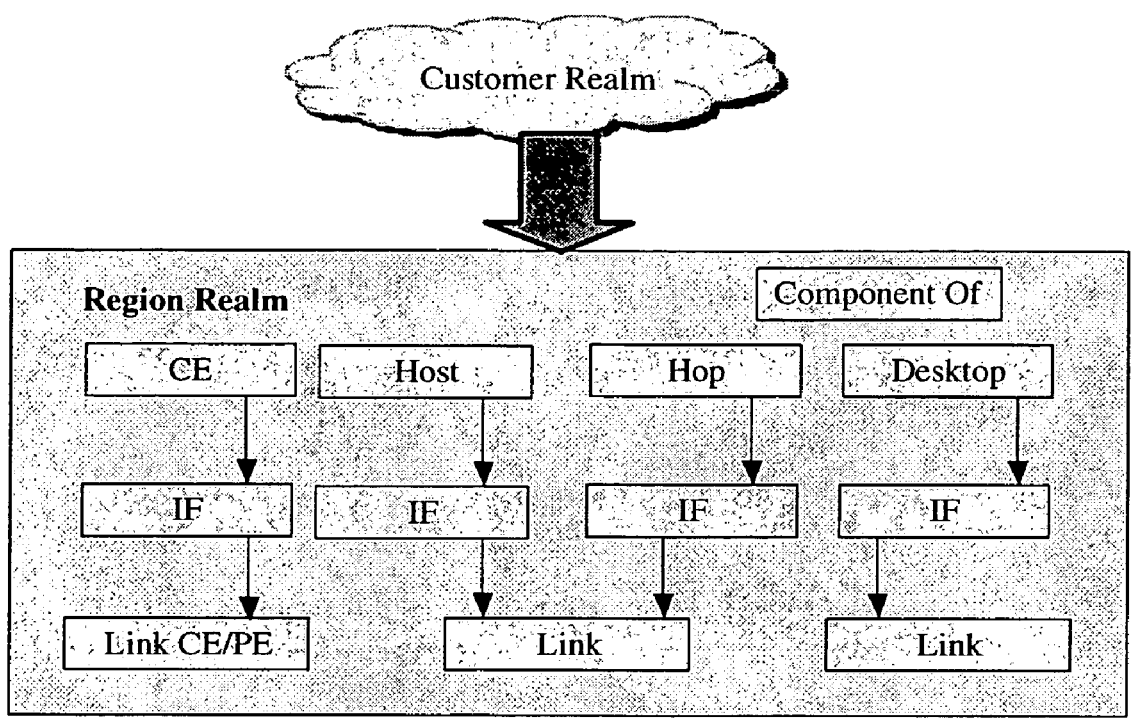
Figure 29:
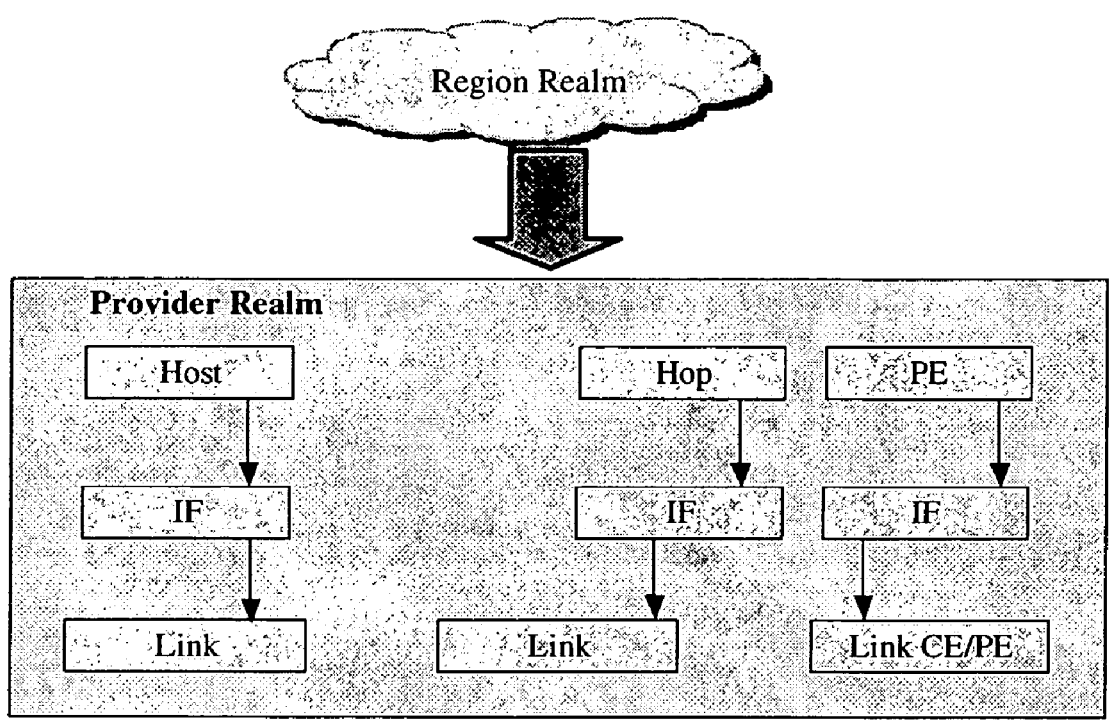

MRSM can use several natural divisions of the system to model the realms. One division can be along geographic regions, e.g., the CA region, the FL region, and the NY region. Another division can be along systems, e.g., the customer system and the service provider system. Each region realm can model its own set of devices such as, e.g., routers, switches, hosts, desktops, laptops, links, LANs, firewalls, etc. Some of the routers, called customer edge (CE) equipment, connect directly to a service provider router called the provider edge (PE) equipment. FIG. 25 depicts the key components of the system. The ellipsis depicts different network domains with only the PE, CE and links between them explicitly represented.

The customer realm is the collection of region realms plus the links between the PE to the CE. The provider realm is the set of routers, links, other network equipment at the provider premises, plus the direct connection between CE and PE that implement the connectivity between the branches of the enterprise.

The associations between realms can represent several relationships between the PE and the CE. The association between regional realms can be objects modeling the CE equipment in each regional realm and a relationship object representing the service provider connection between them. The customer realm and the several regional realms can be linked using a special relationship "Component Of" relationship object to indicate the several components of the customer realm. The association between the customer and the provider realms could be the objects representing the direct connection between respective CE and PE equipments.

FIGS. 26-29 depict the several realms described and some of their objects.

The complete infrastructure solution linked via associations can be used to perform several processing functions, including but not limited to, analysis of events. For example, a failure of a provider link may impact the connectivity between two regions of the enterprise. By propagating events through the associations, one can assess the impact of a provider link or router failure in the overall enterprise and, more specifically, the possible impact on each region.

Example 5

Modeling Application Servers

Application servers are enjoying widespread adoption and are increasingly becoming the platform of choice for development of key distributed applications in both service providers and in the enterprise. The value of such servers is that they create an environment that enables easier code development. Their advantages include: (1) independence from the details of the OS and hardware, with the consequent ease of programmability and portability to different infrastructures; and (2) adoption of simpler programming tools, such as the Java language and its libraries.

Typical application servers are based on Sun's J2EE standard or Microsoft .NET. In addition, there is a standard as part of J2EE that addresses application management: the Java Management Extensions (JMX). There are several products based on J2EE, such as the IBM WebSphere Application Server, and BEA Weblogic.

MRSM modeling in accordance with one or more embodiments of the invention can provide significant advantages in managing such application servers. First, MRSM can allow the definition of a realm for the application server. This realm can be used to monitor the application server performance and availability, the performance and availability of the applications running on it, the database servers connected to it downstream, and application servers connected to it upstream. These components taken together form the infrastructure for distributed applications. Alternatively, several realms can be defined for each facet or component of the application server: application server realm, application server performance realm, application service availability realm, and database server realm.

Additionally, MRSM can monitor across realms: application server, database server, and web server. The MRSM approach allows integration of all realms into a cohesive model of the overall application server and the underlying infrastructure. This model can in turn serve multiple purposes including: design, capacity planning, real-time fault analysis, root cause analysis, impact analysis across all three realms, and other purposes. For example, it is possible to determine that queries to a database are consuming too many processor cycles because a database index is missing.

MRSM also offers management of application server realm objects such as generic OS resources including, e.g., processor, disk, memory, process, and paging. These objects can then be associated with other realm objects to provide a complete and generic end-to-end system model.

Example 6

Figure 30:
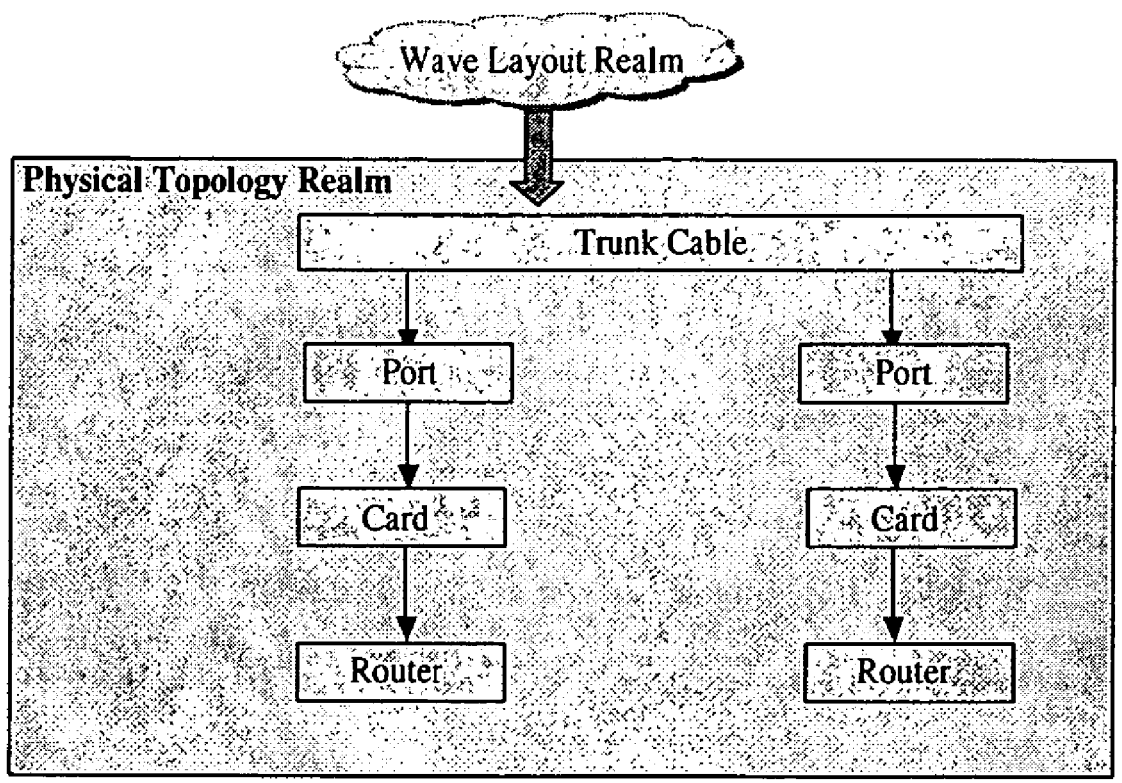
FIG. 30 is a diagram illustrating a physical topology realm of an optical network.
Figure 31:
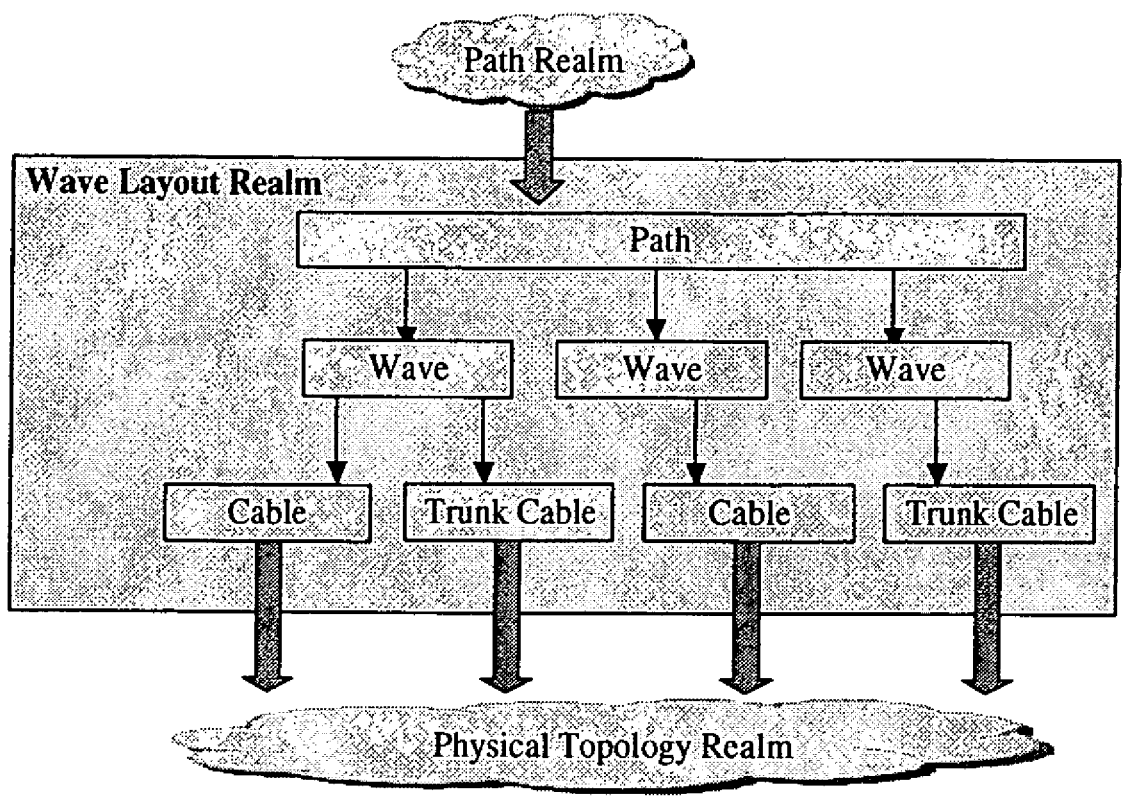
FIG. 31 is a diagram illustrating a wave layout realm of an optical network.
Figure 32:
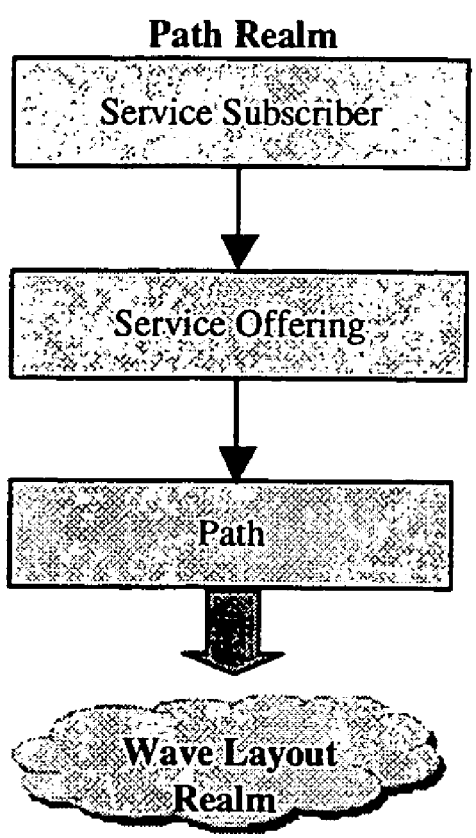
FIG. 32 is a diagram illustrating a path configuration realm of an optical network.

Modeling for Optical Networks Using DWDM (Dense Wavelength Division Multiplexing) Technology MRSM in accordance with one or more embodiments of the invention can also be applied to the management of optical networks by dividing the modeled network into, e.g., the following realms: a physical topology realm (as shown, e.g., in FIG. 30), a wave layout realm (as shown, e.g., in FIG. 31), and a path configuration realm (as shown, e.g., in FIG. 32). The physical topology realm can contain the setup of the physical devices and internal components. The represented devices can include cards, ports, routers, and (trunk) cables. This realm can, if desired, be optimally further divided in the following realms: Intra-device Configuration, Intra-device Connectivity, and Inter-device Connectivity. The wave layout realm can contain the topology and configuration of the optical wavelengths. The objects in this realm can include the paths, wavelengths, and (trunk) cables. Finally the path configuration realm can contain the customer topology and configuration of the optical paths built using the wavelengths.

Each realm represents objects and relationships between objects. For example, a path object connects nodes in the path configuration realm. The path object is a composition of component path elements that ultimately correspond to a wavelength object. The associations can be the following objects: paths and (trunk) cables.

Example 7

MRSM for Layering Logical Networks on Logical or Physical Networks

Figure 33:
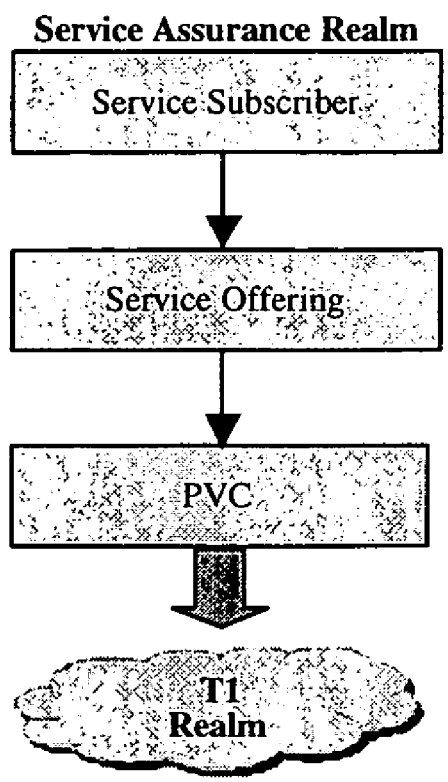
FIG. 33 is a diagram illustrating a service assurance realm of a private network.
Figure 34:
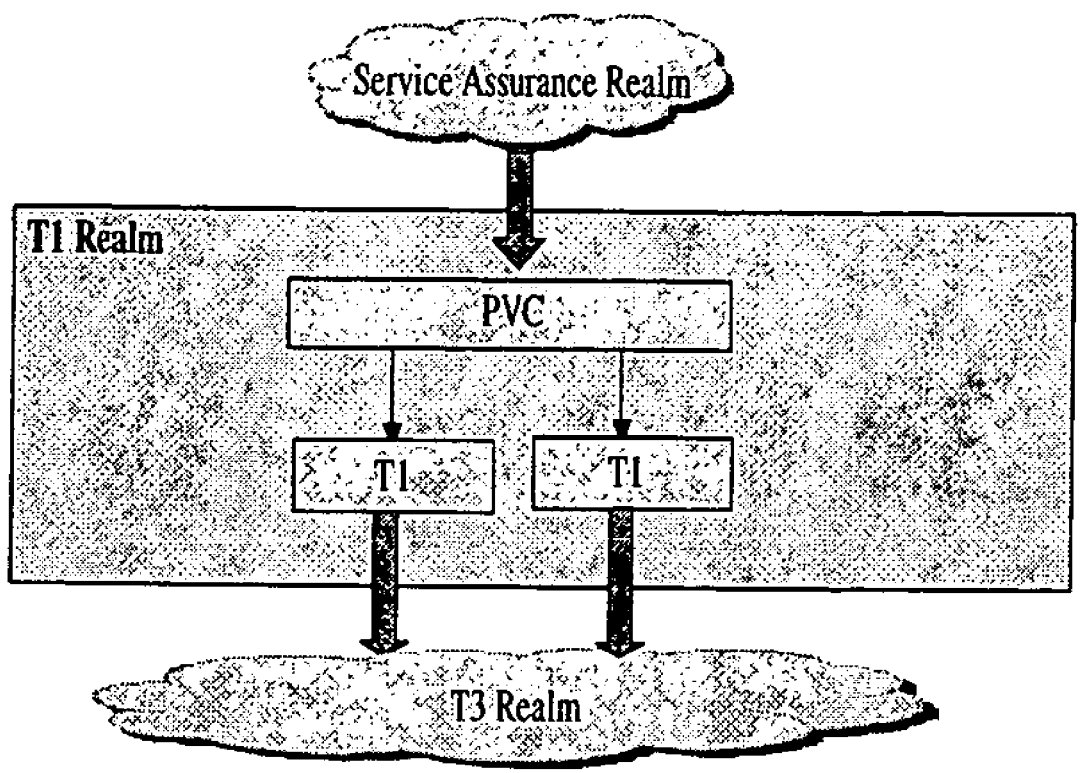
FIG. 34 is a diagram illustrating a T1 realm of a private network.
Figure 35:
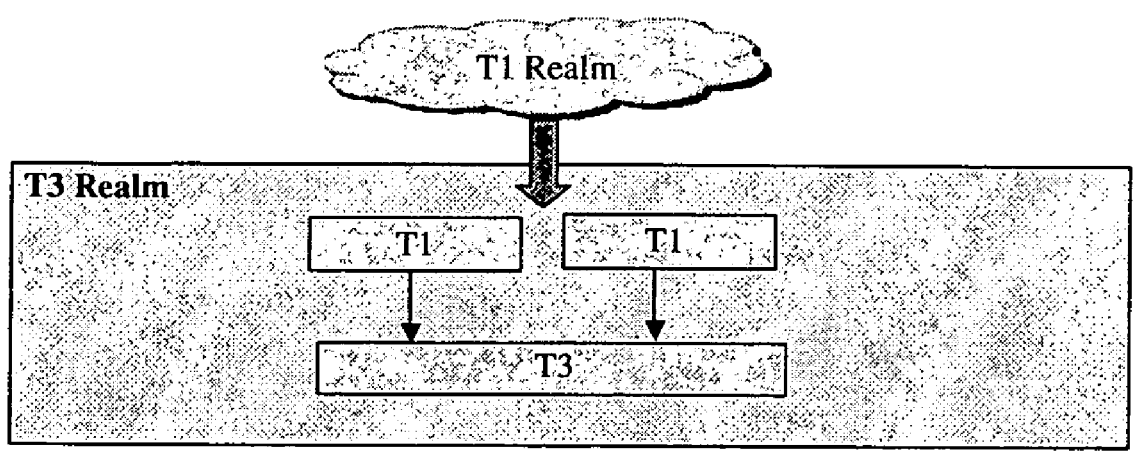
FIG. 35 is a diagram illustrating a T3 realm of a private network.

One of the available techniques to build private networks is to layer logical networks over physical networks. The logical networks themselves may be layered over other logical networks. For example, a Private Virtual Circuit (PVC) may be layered on a virtual T1 link, which in turn is layered over a T3 link. MRSM in accordance with one or more embodiments can be used to model such systems. For example, such systems can be partitioned into three realms: PVC, T1, and T3 shown, e.g., in FIGS. 33-35, respectively. The PVC and T1 objects can be the associations. Objects in the virtual networks can be related by the layering relationship. For example, a T1 link is built from T3 links. The T1 Realm objects can be related to the corresponding T3 Realm objects.

Example 8

MRSM for Multi-Protocol Label Switching (MPLS) Virtual Private Networks (VPNs)

One application of Multi-Protocol Label Switching (MPLS) technology is to build Virtual Private Networks (VPNs). VPNs are virtual networks layered over a physical infrastructure, typically offered by a network service provider. Several VPNs can be layered over the same physical infrastructure, promoting sharing of expensive physical resources with significant savings.

Figure 36:
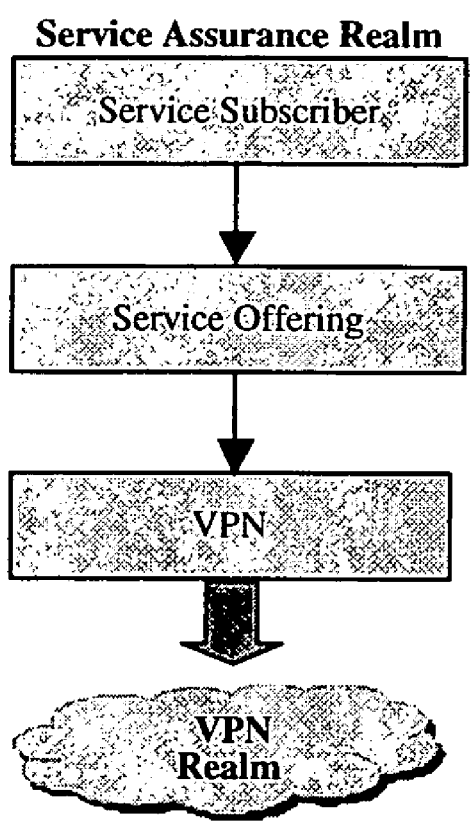
FIG. 36 is a diagram illustrating a service assurance realm of a virtual private network.
Figure 37:
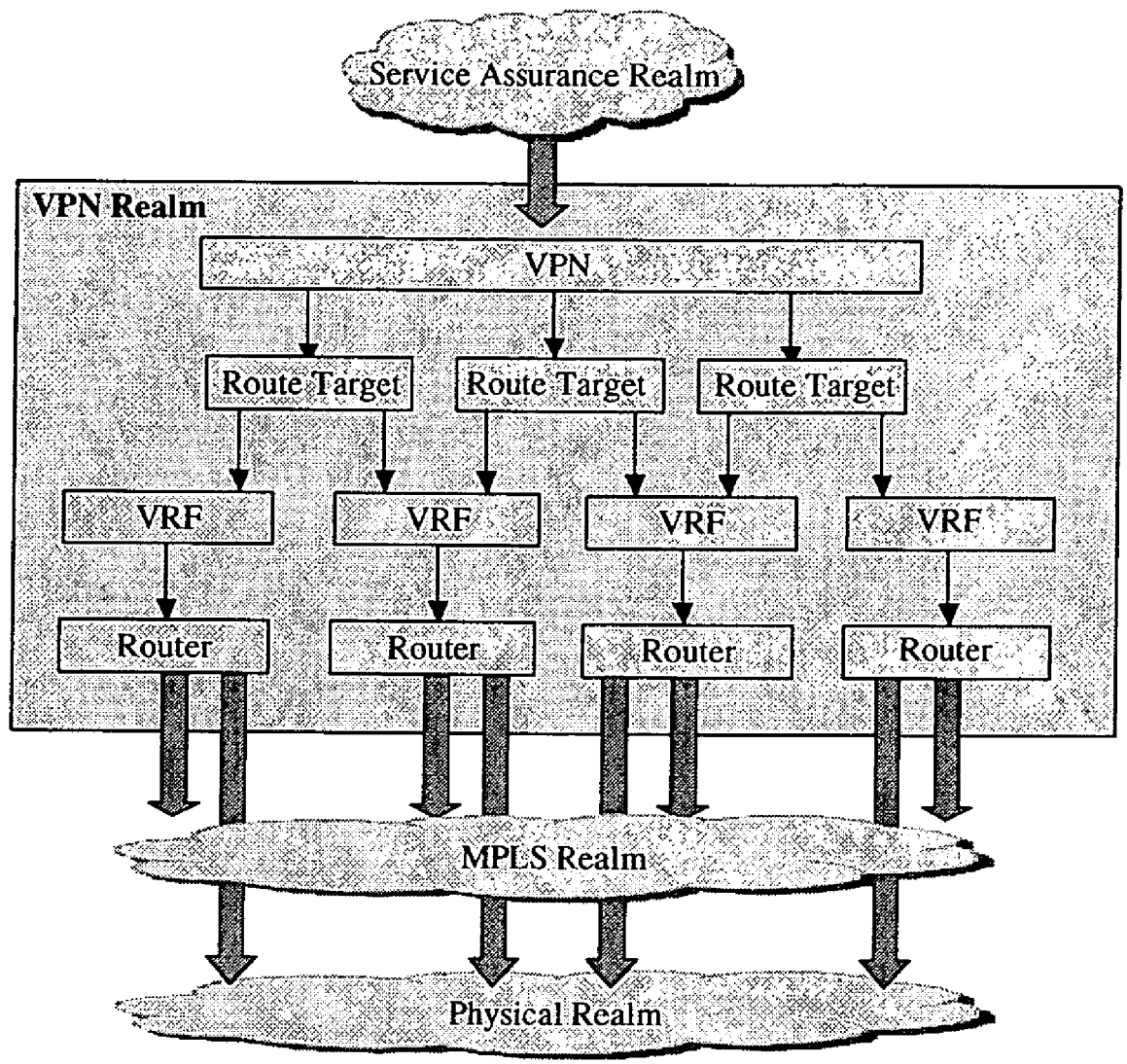
FIG. 37 is a diagram illustrating a VPN realm of a virtual private network.
Figure 38:
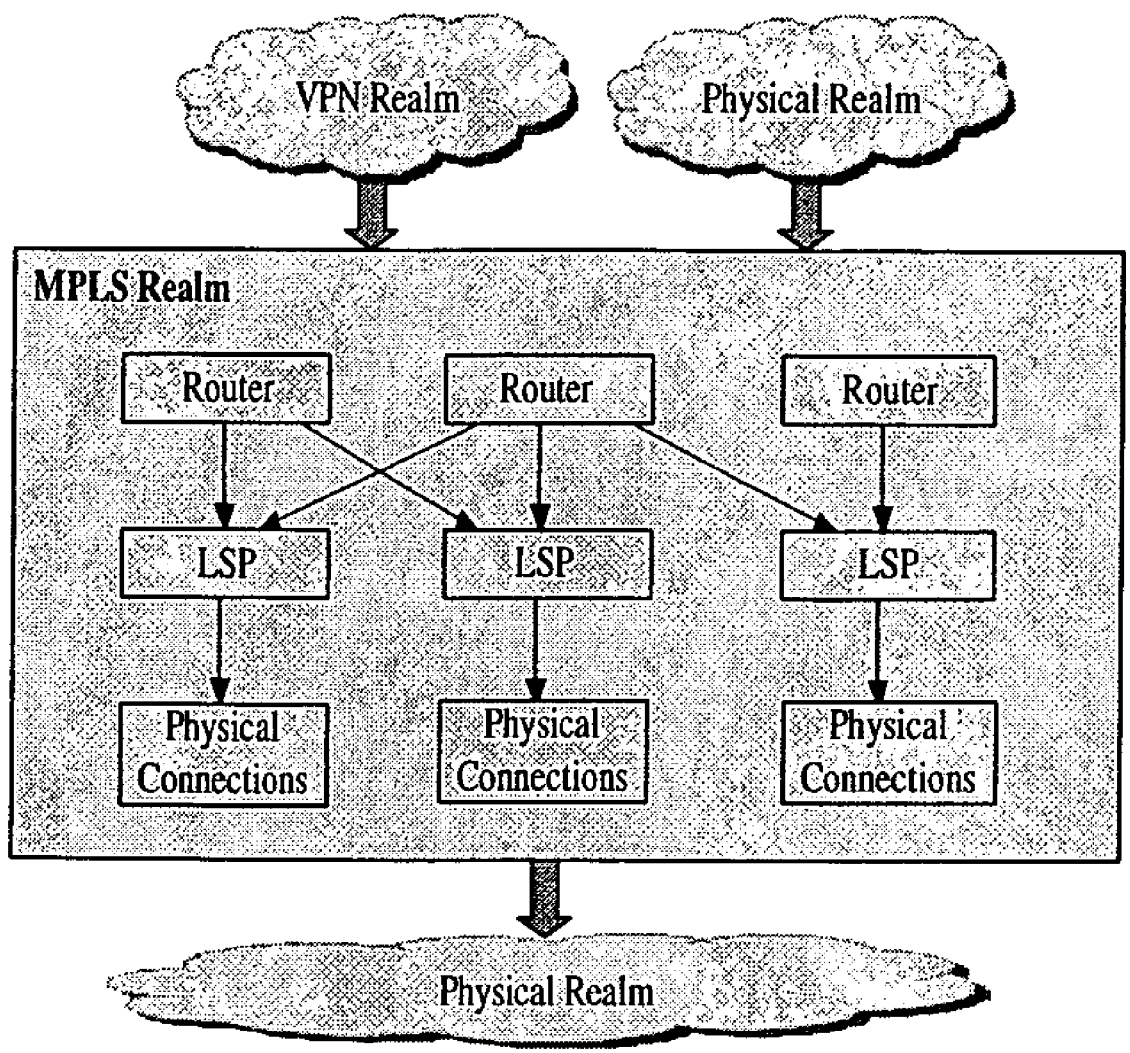
FIG. 38 is a diagram illustrating an MPLS realm of a virtual private network.
Figure 39:
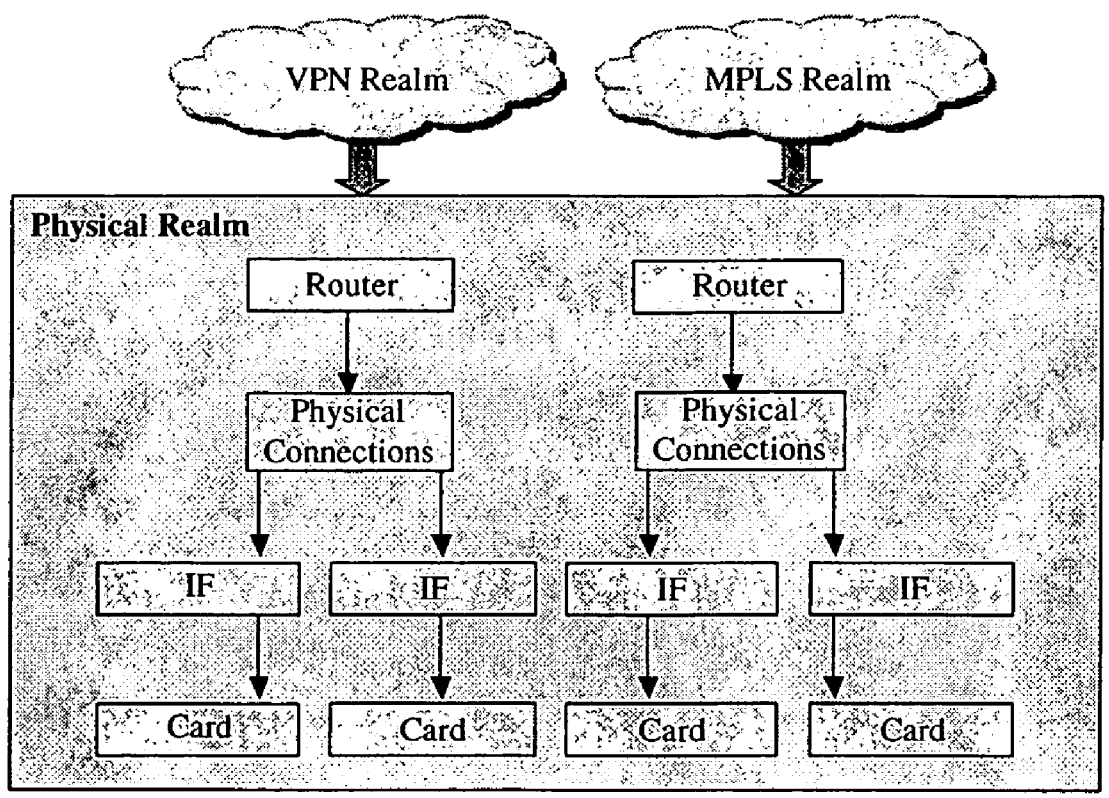
FIG. 39 is a diagram illustrating a physical realm of a virtual private network.

In accordance with one or more embodiments of the invention, MRSM can be applied for MPLS VPN by defining, e.g., the following realms: (1) a service assurance realm (shown, e.g., in FIG. 36), which models the features and performance of end-to-end service as seen by the customer of the VPN service; (2) a VPN realm (shown, e.g., in FIG. 37) which models the member devices of a VPN, their access permissions, and their dependencies on physical devices; (3) an MPLS realm (shown, e.g., in FIG. 38) which models the Label Switching Paths (LSPs) that provide connectivity to VPN member devices and the dependencies of LSPs on the infrastructure; and (4) a physical realm (shown, e.g., in FIG. 39) which models the physical network layer and the intra-device configurations.

The VPN realm can represent the routing components: Route Targets (RTs), Routing and Forwarding Tables (VRFs), routers, and physical connections. The MPLS realm can represent the MPLS objects and related infrastructure: routers, LSPs, and physical connections. The Physical realm can represent the physical devices: routers, physical connections, interfaces (IF), and line cards. VPNs and routers can be the associations. The routers can be associations among three realms (VPN, MPLS, and Physical).

While the above descriptions and examples of MRSM applications have generally focused on IT and other networked systems, the general MRSM technique in accordance with various embodiments can be applied in many other fields. Any complex system that may be too intricate to model as a monolithic whole, may be partitioned into realms and information therefrom correlated into coherent information about the original system viewed as a whole. Examples of a few of the other potential applications are provided below.

Example 9

Modeling for Resource Virtualization, Including Utility Computing Systems

The trend today in IT systems Is to be able optimize the usage of computing, storage, communication resources and others through various virtualization mechanisms that allow treating a collection of similar resources as a pool that are allocated or provisioned dynamically as needed to support a business or provide a service. Resources may include, though are not limited to the following: physical resources such as: computing blades, storage, network equipment, memory, cpu, etc. Logical resources may include but are not limited to: OS resources, database resources, application processes, connection pools, transactions, sessions, middleware, services etc.

Various names have been applied to this approach, including adaptive computing, dynamic systems initiatives, on-demand computing, and other similar initiatives.

One of the key challenges in making this paradigm practical is how to monitor, analyze and control these utility computing systems. MRSM can be applied to address these challenges. Some of the division into realms could be to associate a realm with a pool of similar logical or physical resources. E.g., the blade realm for blades within or across enclosures, various storage realms or other physical resource realms. Similarly database, messaging middleware and other realms for logical resources. And a business/service realm that links the different realms supporting a particular business function or service. Another possibility is to have Realms associated with particular computations, e.g., online shopping, credit checking, warehouse shipping, where objects can come or go based on resource needs. One can even generate realms dynamically to reflect dynamic resource allocation.

Example 10

Modeling for Power Grids and LANs

LANs are being deployed on power lines. One possible application of MRSM in these systems is to model the power grid network and the LAN as two separate realms (each with their own component realms). One can correlate the models by modeling the relationships between the objects in the power grid realm with the ones for the LAN realm. In addition, relationship objects can, e.g., model the throughput the power grid objects (such as power lines) can sustain for the LAN objects (such as links).

Example 11

Weather Forecasting Systems

MRSM can be applied to analyze global weather patterns by combining the results of local weather patterns. It can also be applied to show the relationship of weather maps, geographic maps, airliner route maps, etc. in different realms. For example, one can determine that a hurricane will affect a flight from New York to Miami because the flight will be above a hurricane region when the plane crosses some North Carolina island. It is the multi-realm representation of each of the elements (weather, geographic, airline routes) and their associations that enable such identification of problems.

Example 12

Modeling Effects of Medicine

In one possible medical application, MRSM can be used to model the human body, its organs, its subsystems, and their relationships. The well-known relationships between organs can then be represented. The body can be modeled as one realm. The effect of different medicines on the organs can be modeled as different realms. From information on the structure of the body of a given patient and the medicines the patient is presently taking, the effects and implications of introducing a new medicine can thereby be modeled. Also, MRSM may be applied to analyze the spread of diseases.

Example 13

Modeling Financial Markets

Financial markets are influenced by many different behaviors that can be organized along different realms, e.g., geopolitical events, company earnings announcements, the overall health of the economy, consumer confidence, etc.

Example 14

Modeling Transportation Systems

Aircraft, satellite systems, shuttles, trains, etc. can be divided into a wide range of realms for the purpose of modeling them.

Example 15

Modeling Engineering Systems

Nuclear power plants, factories, urban and other complex engineering systems can be divided into a wide range of realms for the purpose of modeling them.
Similar examples of other applications of MRSM can include, e.g., models of ballistic systems, and satellite systems.

Example 16

Network Infrastructure and Security

Consider an enterprise network that contains components such as, e.g., hosts, desktops, laptops, nodes, and links. MRSM in accordance with one or more embodiments can be used to capture two different perspectives of the system: infrastructure and security.

Figure 40:
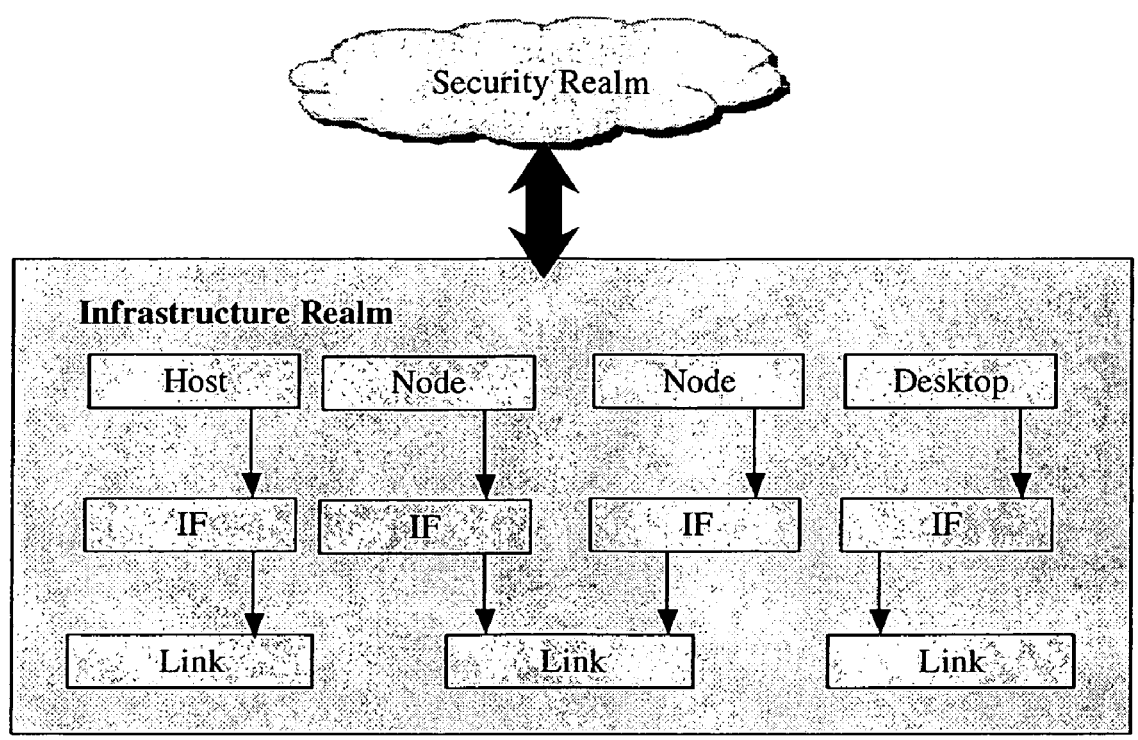
FIG. 40 is a diagram generally illustrating an infrastructure realm of an enterprise network.

The infrastructure perspective can be modeled in an infrastructure realm depicted, e.g., in FIG. 40. It models the technical details of devices, interfaces, and links. Examples of modeled properties are host processor speed, link throughput, connectivity, etc.

Figure 41:
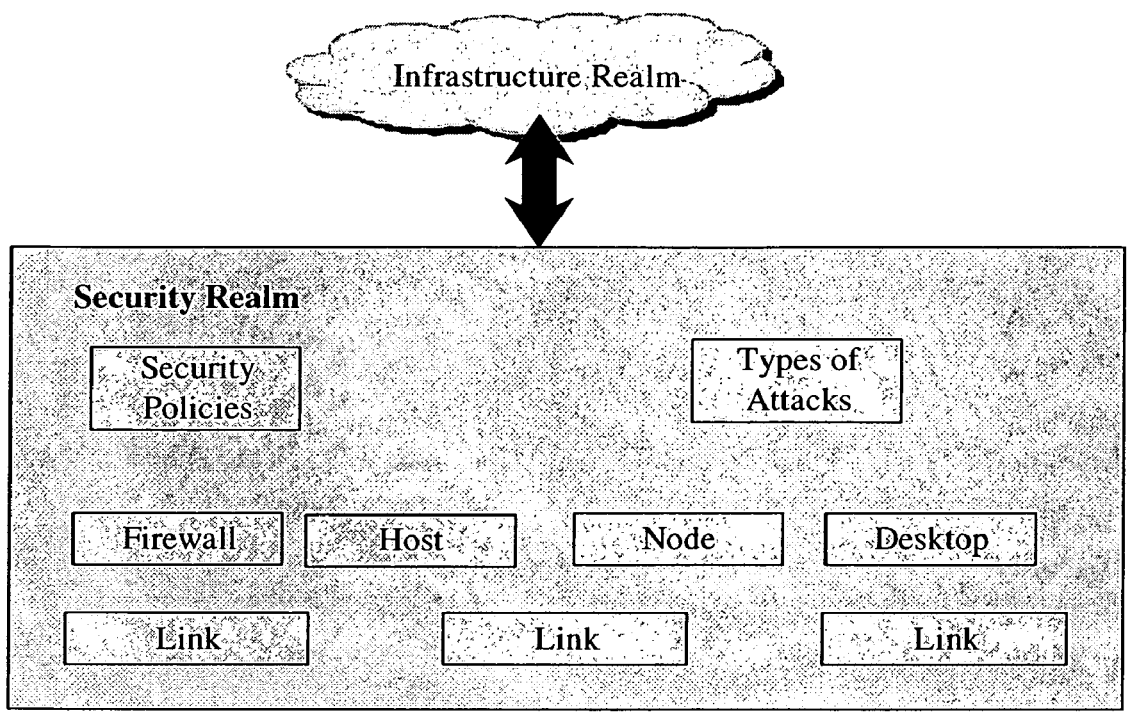
FIG. 41 is a diagram generally illustrating a security realm of the enterprise network.

The security perspective can be modeled in a security realm depicted, e.g., in FIG. 41. The security realm includes the security properties of some of the devices in the infrastructure plus additional components that are important for the security of the infrastructure. For example, it can include objects to represent firewalls and intrusion detection systems. These may or not be part of the infrastructure. A firewall may be a process running in one of the hosts of the infrastructure and may not be relevant for the infrastructure perspective. It can also model the services that each host is executing. It can also model the policies of the system, e.g., that only one designated host can receive HTTP web client requests on port 80. It may explicitly forbid services in other hosts. In addition, it can model the types of attacks that a domain may encounter. For example, a denial of service (DOS) attack may be modeled by an object that captures how the attack happens. The object may have attributes that indicate how many requests per second on a given service indicate such an attack.

The common objects in the infrastructure and security realms form the associations. For example, a host can link the two realms. This can be useful in correlating attack events and system operation events. For example, a DOS attack on a host H will be detected by analyzing events in the security realm objects. An overload situation in the same host H will be detected by analyzing events in the infrastructure realm. But since H is an association of the two realms one can combine the analysis in each realm and deduce that H is overloaded because of an attack in the unified analysis. Similar forms of cross-realm unified analysis are possible in general because of the association between the realms that use the MRSM technique.

Another example is a configuration processing that attempts to add, in the infrastructure realm, application servers on hosts. The configuration processing can check: (1) if the host has enough resources to host the application server using the modeled objects in the infrastructure realm, and (2) if the application server adheres to the security policies set for the host modeled in the objects in the security realm. The association between the realms includes the objects representing the hosts. The association can be used to combine the results of the configuration processing on the security and infrastructure realms in order to decide to accept or rejected the configuration.

The same example may be extended with additional security realms to model different levels of security. Some devices may be in several security realms, if they have different levels of polices. For example, one realm for the R&D development equipment, another for HR, and another for access by customers.

At least some of the method steps of MRSM in accordance with various embodiments of the invention are preferably implemented in one or more computers. A representative computer is a personal computer or workstation platform that is, e.g., Intel Pentium®, PowerPC® or RISC based, and includes an operating system such as Windows®, OS/2®, Unix or the like. As is well known, such machines include a display interface (a graphical user interface or "GUI") and associated input devices (e.g., a keyboard or mouse).

The modeling method is preferably implemented in software, and accordingly one of the preferred implementations is as a set of instructions (program code) in a code module resident in the random access memory of the computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

The invention claimed is:

1. A method for modeling a system having one or more components, comprising:
   (a) dividing said system into one or more components;
   (b) defining a plurality of realms, wherein each of said realms contains objects representing attributes and relationships of selected ones of said one or more components, wherein said one or more components represented include at least one physical element of the system; wherein each of said plurality of realms contains at least one object common to at least two of said plurality of realms;
   (c) defining associations between said plurality of realms to unify objects in said plurality of realms, wherein said associations represent an identification of said at least one object common to at least two of said plurality of realms;
   (d) unifying objects in said realms based on said associations that said at least one object is common to at least two of said plurality of realms; and
   (e) processing a function in a first realm of said plurality of realms independent of said other realms of said plurality of realms
   (f) propagating a behavior, based on a result of said function, of one of the unified objects of said first realm to said unified object of a second realm of said plurality of realms using said at least one association between the first realm and the second realm to determine the impact of the function of the first realm in the second realm.

2. The method of claim 1, further comprising the step of: combining results thereof based on said associations of said two or more realms.

3. The method of claim 2 wherein the unified processing identifies infrastructure problems impacting applications, applications impacting services, or infrastructure problems impacting services.

4. The method of claim 2 wherein said unified processing is selected from the group consisting of: monitoring, analyzing, control, simulation, visualization, configuration, provisioning and design of said system.

5. The method of claim 2 wherein said unified processing is selected from a group consisting: root cause analysis of events in said system, and correlation of events in said system.

6. The method of claim 1 wherein said system is an enterprise management system.

7. The method of claim 1 wherein said realms comprise at least one realm modeling business service components and at least one realm modeling infrastructure components.

8. The method of claim 1 wherein said system is selected from a group consisting of: an engineering system, a distributed system, and application server system, a networked system, an optical system, a wireless network, an IP network, a layered network, a Multi-Protocol Label Switching Virtual Private Network (MPLS VPN), a messaging system, an ERP system, a dynamic system, a static system, a utility computing system, an automatic computing system, a grid system, and on-demand system, and an adaptive system.

9. The method of claim 1 wherein said system comprises a network, and wherein said plurality of realms comprises at least one realm modeling network infrastructure components and at least one realm modeling network security components.

10. The method of claim 1 wherein the step of defining a plurality of realms is performed manually.

11. The method of claim 1 wherein the step of defining a plurality of realms is performed automatically based on given properties of said one or more components.

12. The method of claim 1 wherein 1 wherein the step of defining associations is performed manually.

13. The method of claim 1 wherein the step of defining associations is performed automatically based on given properties of said objects.

14. The method of claim 1 wherein the step of defining associations comprises identifying objects in different realms representing the same component.

15. The method of claim 14 wherein the objects in different realms are substantially identical.

16. The method of claim 14 wherein the objects in different realms are different.

17. The method of claim 16 wherein the objects in different realms have different attributes.

18. The method of claim 1 wherein step (c) comprises defining a relationship object between objects in different realms.

19. The method of claim 1 wherein said plurality of realms are defined based on selecting subsets of components in said system.

20. The method of claim 1 wherein said plurality of realms are defined based on different perspectives of the same component in said system.

21. The method of claim 1 wherein said plurality of realms are defined based on different levels of abstraction of the same component in said system.

22. The method of claim 1 wherein the step of dividing said system comprises the step of:
   defining said plurality of realms based on one or more models of said system or portions thereof.

23. The method of claim 22 wherein said realms are defined by adding associations to one or more pre-existing models of the system.

24. A computer program product in non-transitory computer storage media for modeling a system having one or more components, the computer program product comprising instructions for causing a computer to:
   (a) divide said system into one or more components wherein components include at least one physical element of the system;
   (b) define a plurality of realms including objects therein representing attributes and relationships of said one or more components, wherein said one or more components represented include at least one physical element of the system (c) define associations between realms sufficient to unify the realms, wherein said associations represent at least one object common to at least two of said realms;

(d) unify objects in the realms based on said associations;

(e) process a function in a realm independent of said other realms, and based on said process; and (f) propagate a behavior of one of the unified objects of one realm to said unified object of another realm using at least one association between the one realm and the another realm.

25. The computer program product of claim 24 further comprising instructions for causing the computer to:
perform unified processing of two or more realms by performing processing in each of said two or more realms, and combining results thereof based on said associations of said two or more realms.

26. The computer program product of claim 25 wherein said unified processing is selected from a group consisting of: monitoring, analyzing, control, simulation, visualization, configuration, provisioning and design of said system.

27. The computer program product of claim 25 wherein said unified processing is selected from a group consisting of root cause analysis of events in said system, and correlation of events in said system.

28. The computer program product of claim 24 wherein said system is an enterprise management system.

29. The computer program product of claim 24 wherein said realms comprise at least one realm modeling business service components and at least one realm modeling infrastructure components.

30. The computer program product of claim 24 wherein the unified processing identifies infrastructure problems impacting applications, applications impacting business services, or infrastructure problems impacting business services.

31. The computer program product of claim 24 wherein said system is selected from the group consisting of: an engineering system, a distributed system, an application server system, a networked system, an optical network, a wireless network, an IP network, a layered network, a Multi-Protocol Label Switching Virtual Private Network (MPLS VPN), a messaging system, an ERP system, a dynamic system, a static system, a utility computing system, an autonomic computing system, a grid system, an on-demand system or an adaptive system.

32. The computer program product of claim 24 wherein said system comprises a network, and wherein said plurality of realms comprises at least one realm modeling network infrastructure components and at least one realm modeling network security components.

33. The computer program product of claim 24 wherein the step of dividing is performed automatically based on given properties of said one or more components.

34. The computer program product of claim 24 wherein the step of defining associations is performed automatically based on given properties of said objects.

35. The computer program product of claim 24 wherein the step of defining associations comprises identifying objects in different realms representing the same component.

36. The computer program product of claim 35 wherein the objects in different realms are substantially identical.

37. The computer program product of claim 35 wherein the objects in different realms are different.

38. The computer program product of claim 37 wherein the objects in different realms have different attributes.

39. The computer program product of claim 24 wherein (c) comprises defining a relationship object between objects in different realms.

40. The computer program product of claim 24 wherein said plurality of realms are defined based on selecting subsets of components in said system.

41. The computer program product of claim 24 wherein said plurality of realms are defined based on different perspectives of the same component in said system.

42. The computer program product of claim 24 wherein said plurality of realms are defined based on different levels of abstraction of the same component in said system.

43. The computer program product of claim 24 wherein the step of dividing comprises defining said plurality of realms based on one or more models of said system or portions thereof.

44. The computer program product of claim 43 wherein said realms are defined by adding associations to said one or more models.

45. An apparatus for modeling a system having one or more components, the apparatus comprising:
(a) means for dividing said system into one or more components wherein components include at least one physical element of the system;
(b) means for defining a plurality of realms including objects therein representing attributes and relationships of said one or more components, wherein said one or more components represented include at least one physical element of the system;
(c) means for defining associations between realms sufficient to unify the realms, wherein said associations represent at least one object common to at least two of said realms;
(d) means for unifying objects in the realms based on said associations;
(e) means for processing a function in a realm independent of said other realms, and based on said processing means; and
(f) means for propagating a behavior of one of the unified objects of one realm to said unified object of another realms using at least one association between the one realm and the another realm.

46. The apparatus of claim 45 further comprising means for unified processing of two or more realms by performing processing in each of said two or more realms, and combining results thereof based on said associations of said two or more realms.

47. The apparatus of claim 46 wherein unified processing is selected from the group consisting of: monitoring, analyzing said system.

48. The apparatus of claim 46 unified processing comprises analyzing said system.

49. The apparatus of claim 46 wherein unified processing is selected from a group consisting of: root cause analysis of events in said system and correlation of events in said system.

50. The apparatus of claim 45 wherein said system is an enterprise management system, impacting business services, or infrastructure problems impacting business services.

51. The apparatus of claim 45 wherein said system is selected from the group consisting of: an engineering system, a distributed system, an application server system, a networked system, an optical network, a wireless network, an IP network, a layered network, a Multi-Protocol Label Switching Virtual Private Network (MPLS VPN), a messaging system, an ERP system, a dynamic system, a static system, a utility computing system, an autonomic computing system, a grid system, an on-demand system or an adaptive system.

52. The apparatus of claim 45 wherein said system comprises a network, and wherein said plurality of realms comprises at least one realm modeling network infrastructure components and at least one realm modeling network security components.

53. The apparatus of claim 45 wherein the step of dividing is performed automatically based on given properties of said one or more components.

54. The apparatus of claim 45 wherein the step of defining associations is performed automatically based on given properties of said objects.

55. The apparatus of claim 45 the step of defining associations comprises:
means for identifying objects in different realms representing the same component.

56. The apparatus of claim 55 wherein the objects in different realms are substantially identical.

57. The apparatus of claim 55 wherein the objects in different realms are different.

58. The apparatus of claim 57 wherein the objects in different realms have different attributes.

59. The apparatus of claim 45 wherein the step of defining associations comprises means for defining a relationship object between objects in different realms.

60. The apparatus of claim 45 wherein said plurality of realms are defined based on selecting subsets of components in said system.

61. The apparatus of claim 45 wherein said plurality of realms are defined based on different perspectives of the same component in said system.

62. The apparatus of claim 45 wherein said plurality of realms are defined based on different levels of abstraction of the same component in said system.

63. The apparatus of claim 45 wherein the step of dividing comprises means for defining said plurality of realms based on one or more models of said system or portions thereof.

64. The apparatus of claim 63 wherein said realms are defined by adding associations to said one or more models.

* * * * *